(12) United States Patent
Han

(10) Patent No.: US 12,520,676 B2
(45) Date of Patent: Jan. 6, 2026

(54) DISPLAY SUBSTRATE AND DISPLAY APPARATUS

(71) Applicant: BOE Technology Group Co., Ltd., Beijing (CN)

(72) Inventor: Long Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 539 days.

(21) Appl. No.: 17/921,986

(22) PCT Filed: Jul. 5, 2021

(86) PCT No.: PCT/CN2021/104493
§ 371 (c)(1),
(2) Date: Oct. 28, 2022

(87) PCT Pub. No.: WO2022/042041
PCT Pub. Date: Mar. 3, 2022

(65) Prior Publication Data
US 2023/0189584 A1 Jun. 15, 2023

(30) Foreign Application Priority Data
Aug. 26, 2020 (CN) .......................... 202010872744.8

(51) Int. Cl.
*H10K 59/126* (2023.01)
*G06V 40/13* (2022.01)
(Continued)

(52) U.S. Cl.
CPC ....... *H10K 59/126* (2023.02); *G06V 40/1318* (2022.01); *H10K 59/1213* (2023.02);
(Continued)

(58) Field of Classification Search
None
See application file for complete search history.

(56) References Cited

U.S. PATENT DOCUMENTS

2018/0053811 A1* 2/2018 Wacyk ................. H10K 59/353
2019/0156097 A1* 5/2019 Liu ......................... H10K 59/40
(Continued)

FOREIGN PATENT DOCUMENTS

CN 106298859 A 1/2017
CN 108288681 A 7/2018
(Continued)

OTHER PUBLICATIONS

International Search Report for PCT/CN2021/104493 Mailed Oct. 9, 2021.

*Primary Examiner* — Bilkis Jahan
(74) *Attorney, Agent, or Firm* — Ling Wu; Stephen Yang; Ling and Yang Intellectual Property

(57) ABSTRACT

A display substrate includes a base substrate, including a display region; multiple sub-pixels including first sub-pixels and second sub-pixels adjacent along a first direction, located in the display region, each including a pixel circuit structure; a light-shielding layer, located between the pixel circuit structure and the base substrate, provided with a light transmission hole; a first initialization signal line and a light emitting control signal line extending along the first direction; a first power supply line, extending along a second direction; a first data line, extending along the second direction, connected with the pixel circuit structure of the first sub-pixel; and a second data line, extending along the second direction, connected with the pixel circuit structure of the second sub-pixel; the hole is located within a region enclosed by the first power supply line, the second data line, the light emitting control signal line, and the first initialization signal line.

20 Claims, 23 Drawing Sheets

(51) Int. Cl.
    *H10K 59/121*    (2023.01)
    *H10K 59/131*    (2023.01)
    *H10K 59/35*     (2023.01)
    *H10K 59/65*     (2023.01)
    *H10K 59/80*     (2023.01)

(52) U.S. Cl.
    CPC ....... *H10K 59/1216* (2023.02); *H10K 59/131* (2023.02); *H10K 59/353* (2023.02); *H10K 59/65* (2023.02); *H10K 59/8792* (2023.02)

(56) References Cited

U.S. PATENT DOCUMENTS

| | | | |
|---|---|---|---|
| 2019/0213379 A1* | 7/2019 | Zhao | .................... H10K 50/865 |
| 2020/0388662 A1 | 12/2020 | Tian et al. | |
| 2021/0366933 A1 | 11/2021 | Zhang | |
| 2022/0336566 A1 | 10/2022 | Chen et al. | |

FOREIGN PATENT DOCUMENTS

| | | |
|---|---|---|
| CN | 108511465 A | 9/2018 |
| CN | 108962957 A | 12/2018 |
| CN | 109860306 A | 6/2019 |
| CN | 110112072 A | 8/2019 |
| CN | 110504275 A | 11/2019 |
| CN | 110767739 A | 2/2020 |
| CN | 210349260 U | 4/2020 |
| CN | 210535236 U | 5/2020 |
| CN | 111477669 A | 7/2020 |
| KR | 10-2020-0047007 A | 5/2020 |

* cited by examiner

DISPLAY SUBSTRATE AND DISPLAY APPARATUS

CROSS-REFERENCE TO RELATED APPLICATIONS

The present application is a U.S. National Phase Entry of International Application No. PCT/CN2021/104493 having an international filing date of Jul. 5, 2021, which is based on and claims the priority to the Chinese Patent Application No. 202010872744.8, filed on Aug. 26, 2020. The above-identified applications are incorporated herein by reference in their entireties.

TECHNICAL FIELD

The present application relates to the technical field of display, specifically to a display substrate, and a display apparatus.

BACKGROUND

With a continuous development of display technologies, display apparatuses with a Fingerprint on Display function (such as smart phones) are increasingly favored by users at present. Fingerprint on Display means that a fingerprint identification module is integrated into a display panel, and a fingerprint identification may be achieved by touching, by a finger, a region corresponding to the fingerprint identification module on a screen glass cover plate. However, at present, the display apparatuses with the Fingerprint on Display function still have a problem of a relatively low fingerprint identification sensitivity.

Therefore, at present, the display apparatuses with the Fingerprint on Display function still need to be improved.

SUMMARY

In view of this, in one aspect of the present application, the present application provides a display substrate. The display substrate includes: a base substrate, including a display region; multiple sub-pixels, located in the display region, wherein a sub-pixel includes a pixel circuit structure, and the multiple sub-pixels includes a first sub-pixel and a second sub-pixel adjacent along a first direction; a light shielding layer, located between the pixel circuit structure and the base substrate, wherein a light transmission hole is provided in the light shielding layer; a first initialization signal line, extending along the first direction; a light emitting control signal line, extending along the first direction; a first power supply line, extending along a second direction, wherein the first direction intersects with the second direction; a first data line, extending along the second direction, wherein the first data line is connected with a pixel circuit structure of the first sub-pixel; and a second data line, extending along the second direction, wherein the second data line is connected with a pixel circuit structure of the second sub-pixel, and the first data line and the second data line are respectively located at two sides of the first power supply line; herein, the light transmission hole is located within a region enclosed by the first power supply line, the second data line, the light emitting control signal line, and the first initialization signal line. Therefore, a display apparatus applying the display substrate has a relatively high fingerprint identification sensitivity and a relatively high resolution.

Further, the display substrate includes a gate line, a reset control signal line, and a second initialization signal line extending along the first direction, wherein in the second direction, the gate line, the reset control signal line, and the second initialization signal line are sequentially arranged at one side of the light emitting control signal line away from the first initialization signal line, and the pixel circuit structure of the first sub-pixel and the pixel circuit structure of the second sub-pixel are respectively connected with the second initialization signal line.

Further, in the first direction, a width of the light transmission hole is less than ⅓ of a distance between the first data line and the second data line. The pixel circuit structure of the first sub-pixel includes a first light emitting control transistor and a second light emitting control transistor. A first electrode of the first light emitting control transistor is located at a first side of the light emitting control signal line. A second electrode of the first light emitting control transistor is located at a second side of the light emitting control signal line, a second electrode of the second light emitting control transistor is located at the first side of the light emitting control signal line, a first electrode of the second light emitting control transistor is located at the second side of the light emitting control signal line, the first side and the second side are two opposite sides of the light emitting control signal line. The light transmission hole is located between the first electrode of the first light emitting control transistor and the second electrode of the second light emitting control transistor.

Further, in the first direction, a width of the light transmission hole is ⅓ to ½ of a distance between the first data line and the second data line. The light emitting control signal line includes a first sub-portion, a second sub-portion, and a third sub-portion, the first sub-portion being located between the second sub-portion and the third sub-portion, the first sub-portion extending along the first direction, the second sub-portion and the third sub-portion extending along the second direction, and in the first direction, at least part of the second sub-portion being located between the first power supply line and the second data line. The pixel circuit structure of the first sub-pixel includes a first light emitting control transistor and a second light emitting control transistor, a first electrode of the first light emitting control transistor being located at a first side of the first sub-portion, a second electrode of the first light emitting control transistor being located at a second side of the first sub-portion, a second electrode of the second light emitting control transistor being located at the first side of the first sub-portion, a first electrode of the second light emitting control transistor being located at the second side of the first sub-portion, and the first side and the second side being two opposite sides of the first sub-portion. The light transmission hole is located within a region enclosed by the first power supply line, the second sub-portion, the second electrode of the second light emitting control transistor, the first electrode of the first light emitting control transistor, and the first initialization signal line.

Further, in the first direction, at least part of the third sub-portion is located at one side of the first data line away from the first power supply line, and the second sub-portion is located at one side of the second electrode of the second light emitting control transistor away from the first power supply line.

Further, in the first direction, a width of the light transmission hole is greater than ½ of a distance between the first data line and the second data line. The light emitting control signal line includes a first sub-portion, a second sub-portion, and a third sub-portion, the first sub-portion being located between the second sub-portion and the third sub-portion, the first sub-portion extending along the first direction, the second sub-portion and the third sub-portion extending along the second direction, and in the first direction, at least part of the second sub-portion being located between the first power supply line and the second data line. An active layer in the pixel circuit structure of the first sub-pixel is located within a region enclosed by the first initialization signal line, the second initialization signal line, the first data line, and the second data line, the active layer in the first sub-pixel is a first active layer. An orthographic projection of the first active layer on the base substrate has no overlapping region with an orthographic projection of the gate line and the light emitting control signal line on the base substrate, and the light transmission hole is located within a region enclosed by the first power supply line, the first sub-portion, the second sub-portion, and the first initialization signal line.

Further, in the first direction, at least part of the third sub-portion is located between the first data line and the first power supply line.

Further, the reset control signal line includes a fourth sub-portion extending along the first direction and bent portions located at two ends of the fourth sub-portion, at least part of the fourth sub-portion being located between the first data line and the second data line. The gate line includes a fifth sub-portion, a sixth sub-portion, and a seventh sub-portion, the fifth sub-portion being located between the sixth sub-portion and the seventh sub-portion, the fifth sub-portion extending along the first direction, the sixth sub-portion and the seventh sub-portion extending along the second direction, and in the first direction, at least part of the sixth sub-portion being located between the first data line and the second data line. The multiple sub-pixels include a third sub-pixel adjacent to the second sub-pixel along the first direction, a third data line extends along the second direction, and is connected with the pixel circuit structure of the third sub-pixel, and parts of the reset control signal line, the gate line, and the light emitting control signal line located between the second data line and the third data line all extend along the first direction. Herein a distance between the fourth sub-portion and the fifth sub-portion is $D_1$, a spacing between a part of the reset control signal line located between the second data line and the third data line and a part of the gate line located between the second data line and the third data line is $D_2$, the $D_1$ being less than the $D_2$. A spacing between the fifth sub-portion and the first sub-portion is $D_3$, and a spacing between the part of the gate line located between the second data line and the third data line and a part of the light emitting control signal line located between the second data line and the third data line is $D_4$, the $D_3$ being less than the $D_4$.

Further, an active layer in the pixel circuit structure of the first sub-pixel is located within a region enclosed by the first initialization signal line, the second initialization signal line, the first data line, and the second data line, and an active layer in the pixel circuit structure of the second sub-pixel is located within a region enclosed by the first initialization signal line, the second initialization signal line, the second data line, and the third data line, wherein the active layer in the first sub-pixel is a first active layer, the active layer in the second sub-pixel is a second active layer. A width of the first active layer is $D_7$, a width of the second active layer is $D_8$, the $D_7$ is less than the $D_8$. A length of the first active layer is $L_1$, a length of the second active layer is $L_2$, and the $L_1$ is less than the $L_2$.

Further, in the first direction, when a width of the light transmission hole is ⅓ to ½ of a distance between the first data line and the second data line, the first sub-pixel includes a light emitting element, wherein the light emitting element is located at one side of the pixel circuit structure away from the base substrate, and in the second direction, an anode of the light emitting element is located at one side of the first sub-portion away from a second electrode of the second light emitting control transistor.

Further, a ratio of a width of an active layer to a length of a gate of a thin film transistor in the pixel circuit structure of the first sub-pixel is consistent with a ratio of a width of an active layer to a length of a gate of a thin film transistor in the pixel circuit structure of the second sub-pixel.

Further, in the first direction, when a width of the light transmission hole is greater than ½ of a distance between the first data line and the second data line, the first sub-pixel includes a light emitting element, wherein the light emitting element is located at one side of the pixel circuit structure away from the base substrate, and an anode is not in contact with a light emitting layer in the light emitting element.

Further, an orthographic projection of the first active layer on the base substrate has no overlapping region with an orthographic projection of the reset control signal line on the base substrate.

Further, the display substrate includes at least one fingerprint identification region, wherein the light transmission hole is provided within the fingerprint identification region.

In another aspect of the present application, the present application provides a display apparatus. The display apparatus includes the display substrate described above. Therefore, the display apparatus has all features and advantages of the display substrate described above, which will not be repeated here. In general, the display apparatus has a relatively high fingerprint identification sensitivity and a relatively high resolution.

BRIEF DESCRIPTION OF DRAWINGS

The above mentioned and/or additional aspects and advantages of the present application will become apparent and easy to understand from the following description of embodiments in conjunction with accompanying drawings.

DETAILED DESCRIPTION

Figure 1A:
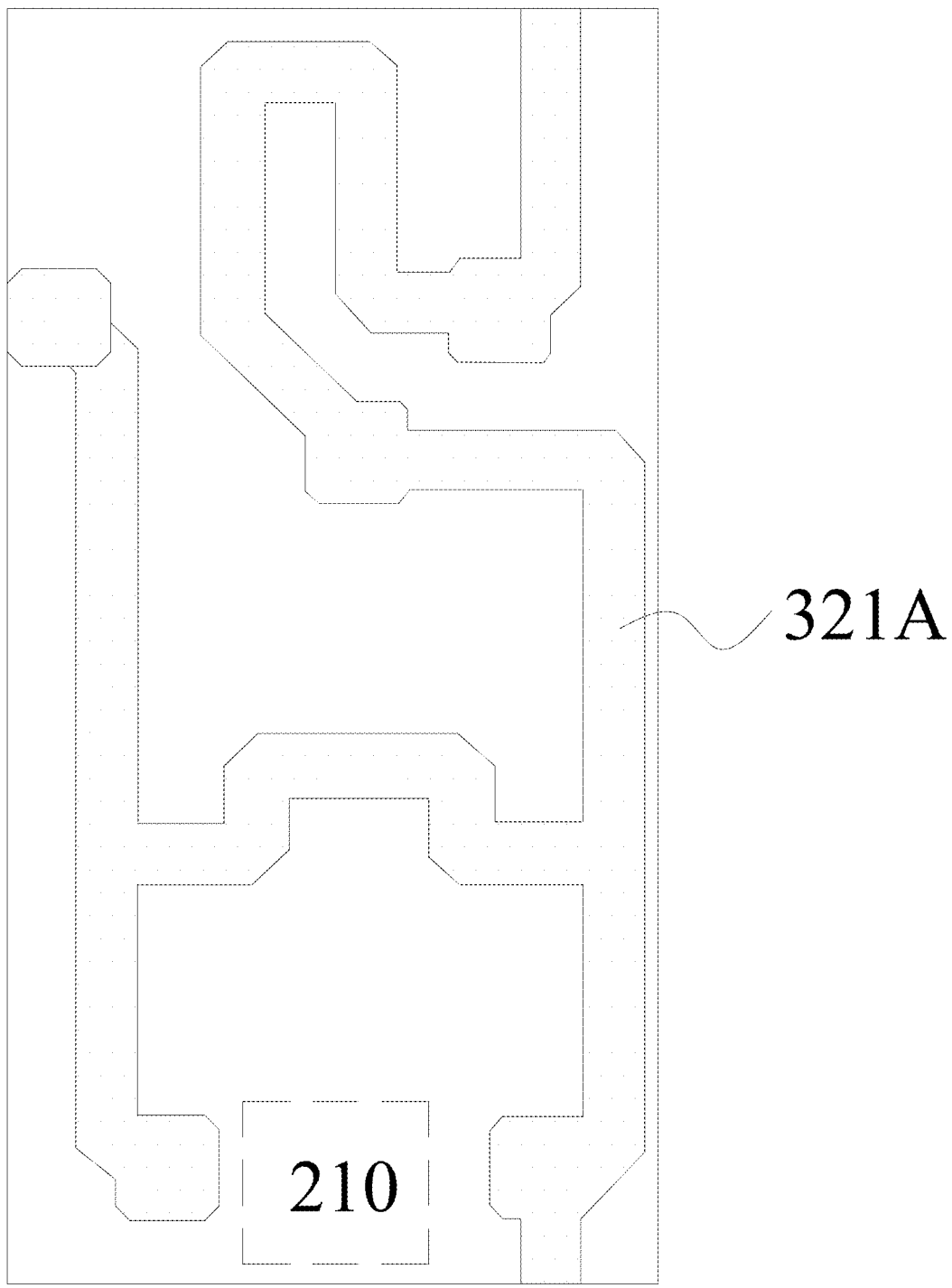
FIG. 1A shows a schematic top view of a first active layer according to an embodiment of the present application.

Descriptions will now be made in detail to embodiments, illustrations of which are shown in the accompanying drawings. The same or similar, or functionally same or similar elements are indicated by like reference numerals throughout the descriptions. The embodiments described herein with reference to the accompanying drawings are exemplary, used for explaining the present application only, but should not be construed to limit the present application.

In one aspect of the present application, the present application provides a display substrate. According to an embodiment of the present application, referring to FIG. 3, the display substrate includes: a base substrate 100, a light shielding layer 200, and multiple sub-pixels 300 (only one sub-pixel is shown in FIG. 3), wherein the base substrate 100 includes a display region in which the multiple sub-pixels 300 are located, a sub-pixel 300 includes a pixel circuit structure 320, the light shielding layer 200 is located between the pixel circuit structure 320 and the base substrate 100, and a light transmission hole 210 is provided in the light shielding layer 200 (refer to FIG. 2, the light transmission hole is not shown in FIG. 3).

Figure 1B:
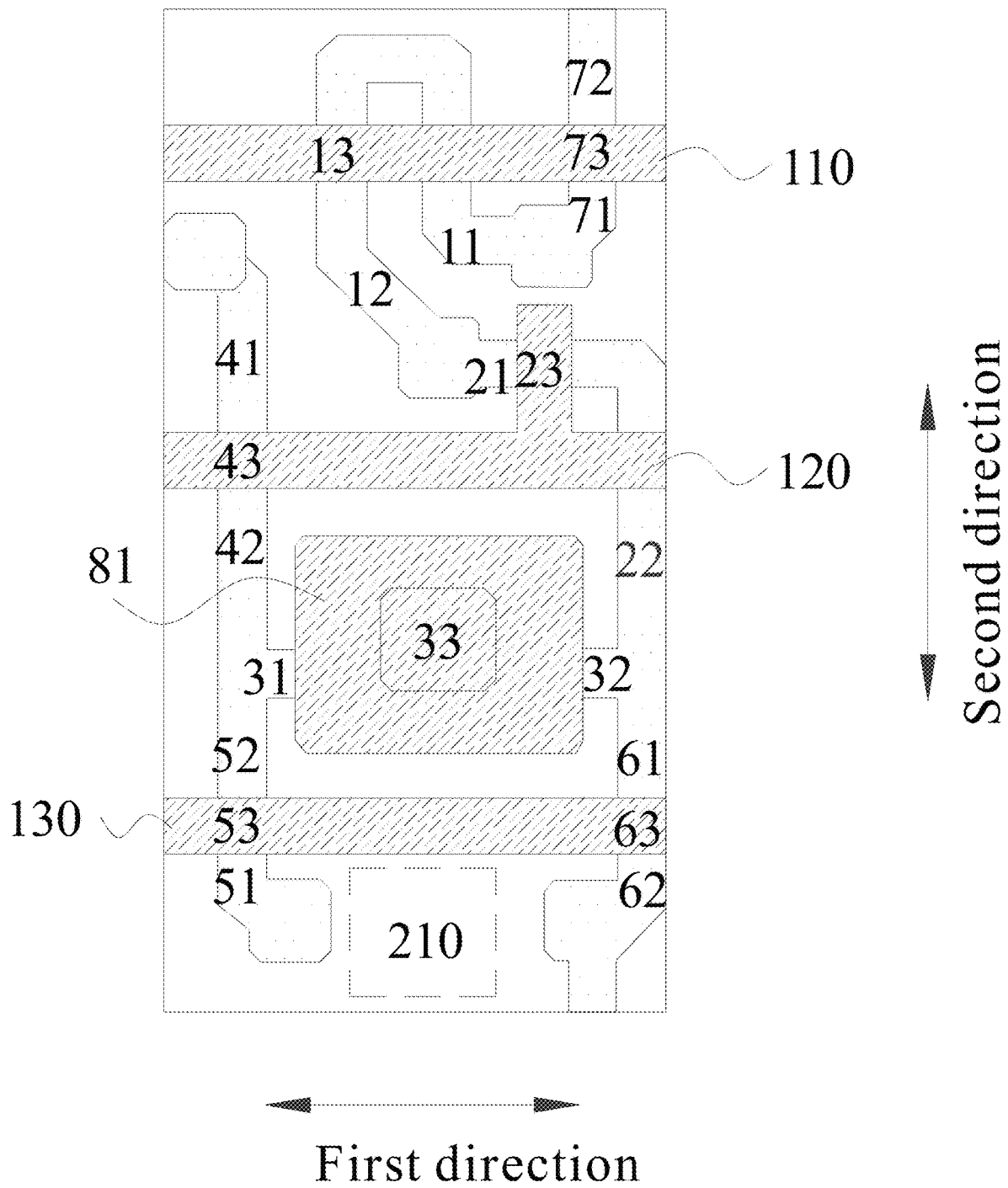
FIG. 1B shows a schematic top view of a reset control signal line, a gate line, a light emitting control signal line, and a lower electrode plate of a storage capacitor portion formed at one side of a first active layer away from a base substrate according to an embodiment of the present application.
Figure 1C:
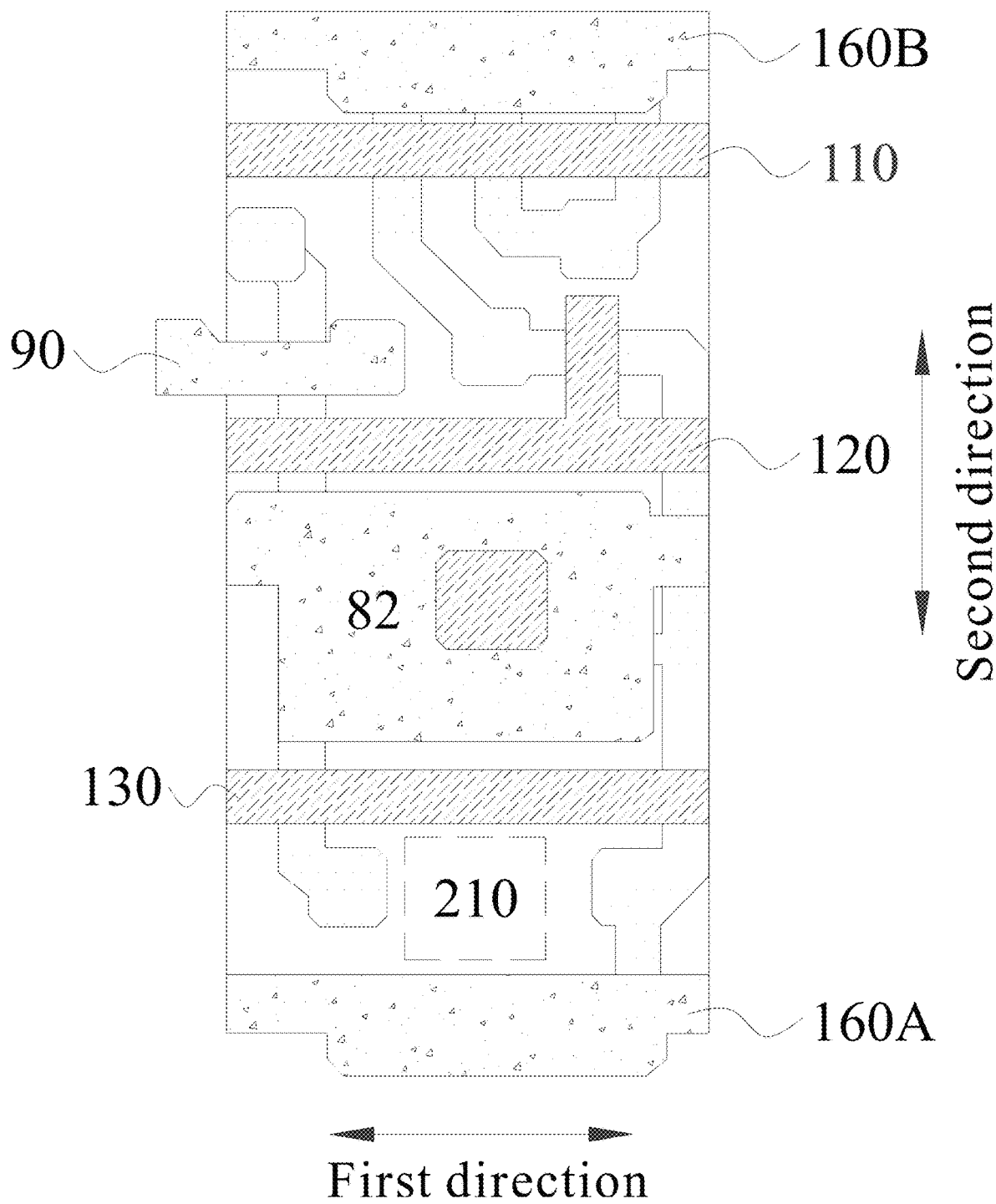
FIG. 1C shows a schematic top view of a first initialization signal line, a second initialization signal line, and an upper electrode plate of a storage capacitor portion formed at one side of a reset control signal line, a gate line, a light emitting control signal line, a lower electrode plate of a storage capacitor portion away from a base substrate according to an embodiment of the present application.
Figure 1D:
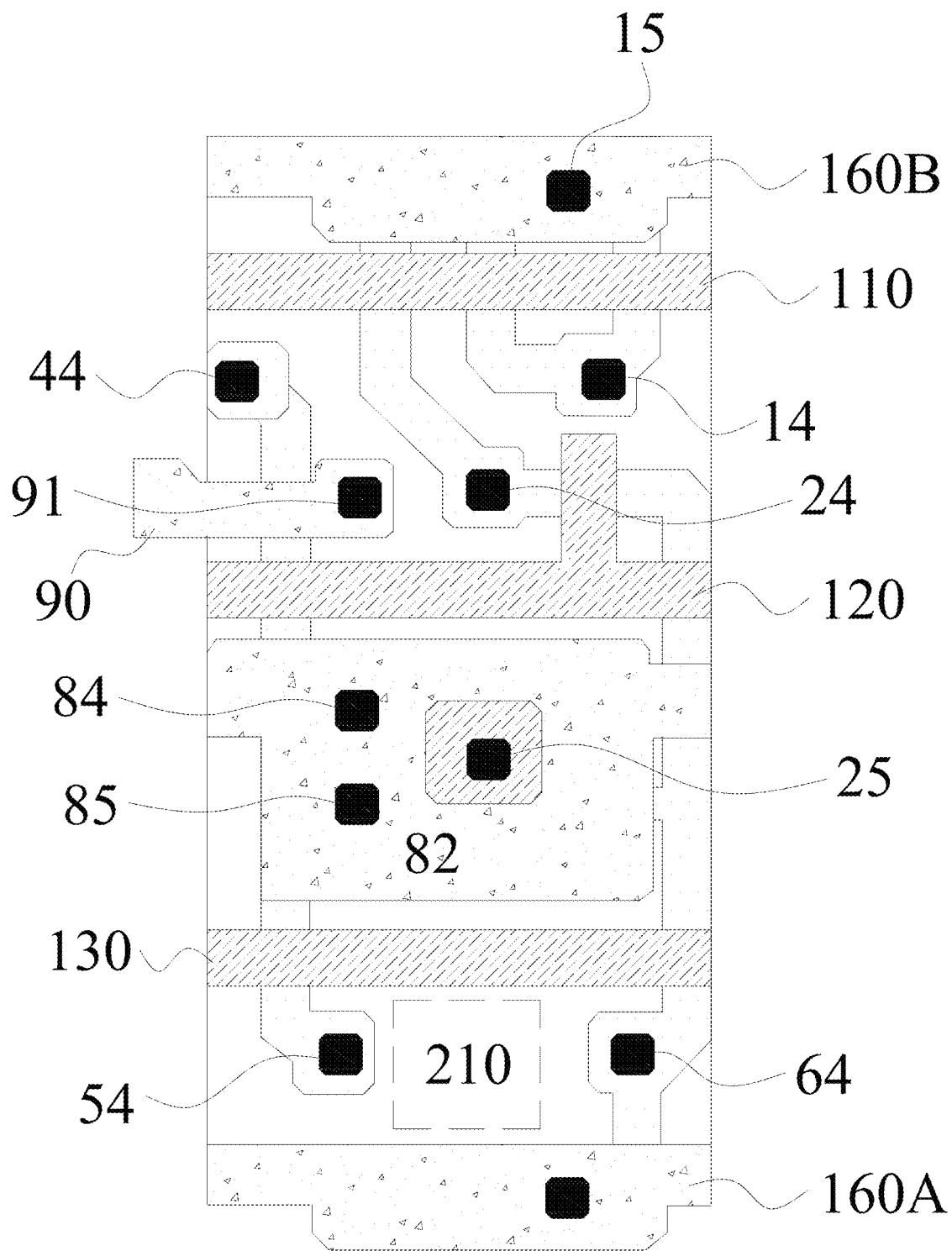
FIG. 1D shows a schematic diagram of disposing via holes on a first initialization signal line, a second initialization signal line, a first active layer, an upper electrode plate of a storage capacitor portion, and a lower electrode plate of a storage capacitor according to an embodiment of the present application.
Figure 1E:
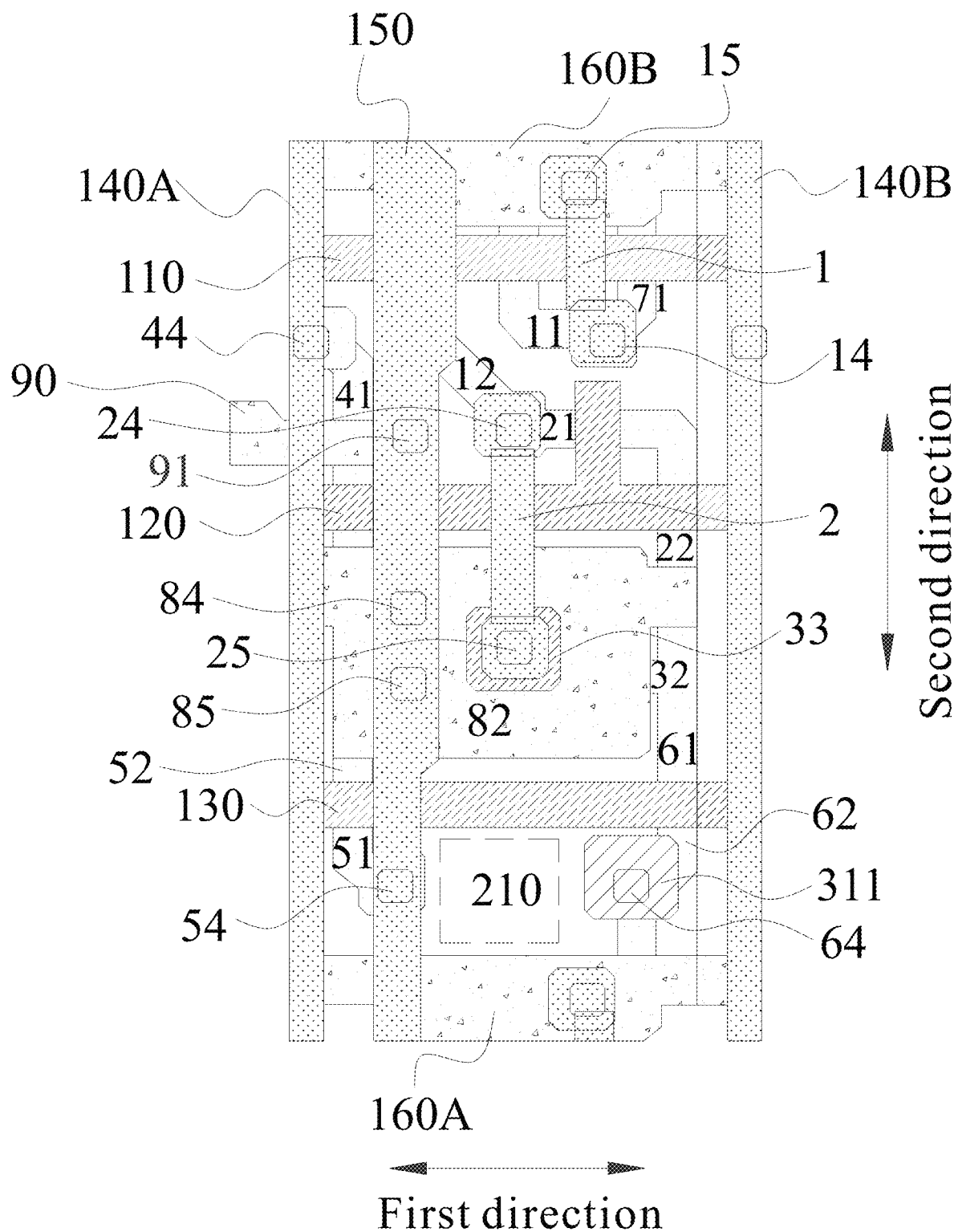
FIG. 1E shows a schematic top view of a first data line, a second data line, and a first power supply line formed at one side of a first initialization signal line, a second initialization signal line, and an upper electrode plate of a storage capacitor portion away from a base substrate according to an embodiment of the present application.
Figure 1F:
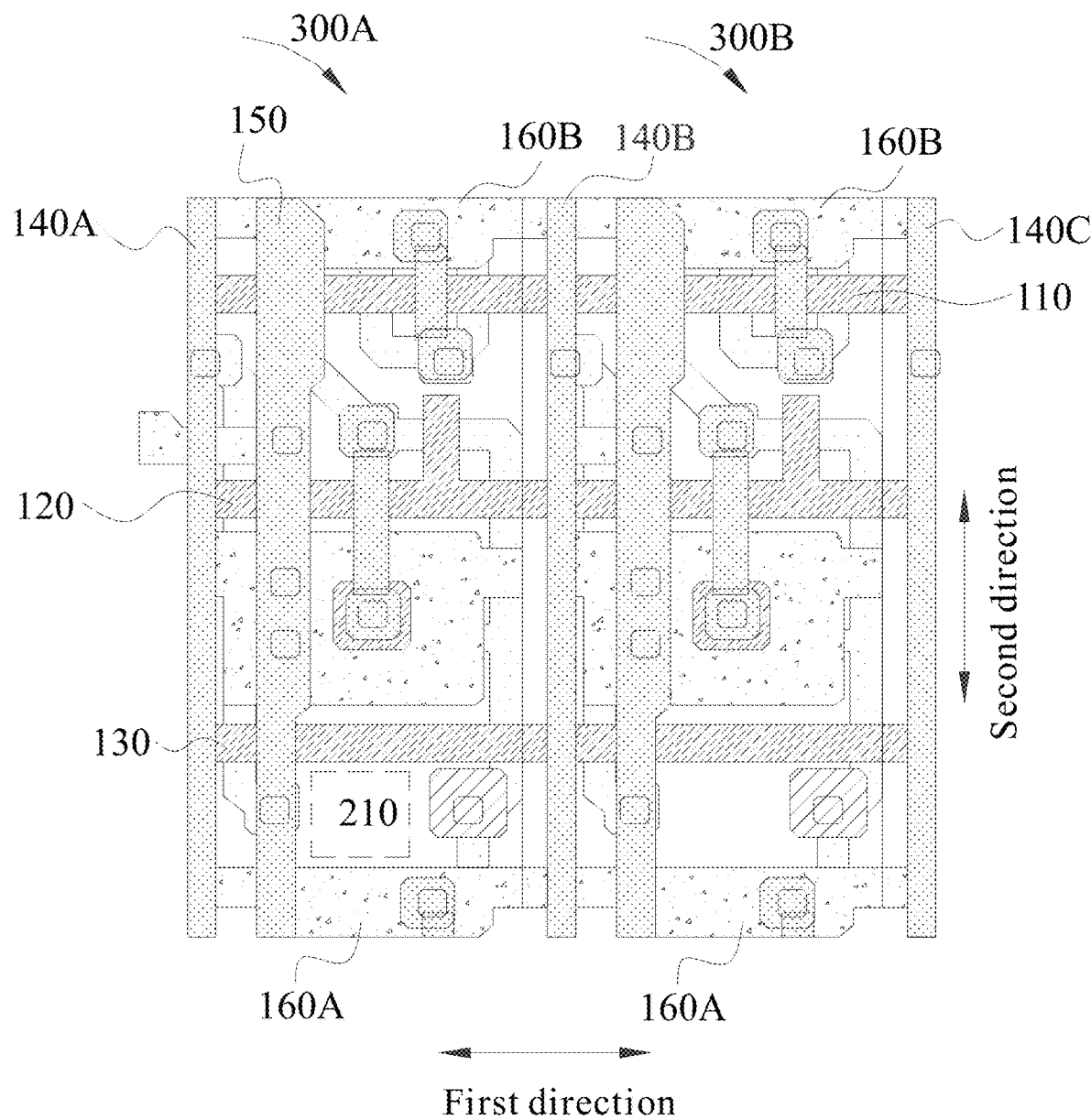
FIG. 1F shows a schematic diagram of a structure of a first sub-pixel and a second sub-pixel according to an embodiment of the present application.

Referring to FIG. 1F, the multiple sub-pixels include a first sub-pixel 300A and a second sub-pixel 300B adjacent along a first direction, the display substrate further includes: a first initialization signal line 160A, a light emitting control signal line 130 extending along the first direction, and a first power supply line 150, a first data line 140A, a second data line 140B extending along a second direction, wherein the first direction intersects with the second direction, the first data line 140A is connected with the pixel circuit structure of the first sub-pixel 300A, the second data line 140B is connected with the pixel circuit structure of the second sub-pixel 300B, the first data line 140A and the second data line 140B are respectively located at two sides of the first power supply line 150, and the light transmission hole 210 in the light shielding layer is located within a region enclosed by the first power supply line 150, the second data line 140B, the light emitting control signal line 130, and the first initialization signal line 160A. Therefore, a display apparatus in which the display substrate is applied has a relatively high fingerprint identification sensitivity and a relatively high resolution.

According to an embodiment of the present application, the display substrate further includes a fingerprint identification sensor (not shown in the figure), wherein the fingerprint identification sensor is disposed at one side of the base substrate away from the light shielding layer, and an orthographic projection of the light transmission hole on the base substrate at least partial overlaps with an orthographic projection of the fingerprint identification sensor on the base substrate. The fingerprint identification sensor is used for collecting an optical signal transmitted from the light transmission hole, and converting the optical signal into an electrical signal, extracting fingerprint information, and achieving a fingerprint identification after data processing. According to the present application, by disposing a light shielding layer in a display substrate, and disposing a light transmission hole in the light shielding layer, based on a principle of pinhole imaging, in a fingerprint identification process, part of light reflected by a finger may be injected into a fingerprint identification sensor through the light transmission hole to achieve a fingerprint identification, and the light shielding layer may block light in a region outside the light transmission hole to prevent light in other regions from interfering with the fingerprint identification process, and thus may improve a fingerprint identification sensitivity of the display apparatus in which the display substrate is applied. A specific material of the light shielding layer is not particularly limited, and for example, the light shielding layer may be formed by a metal material.

Figure 3:
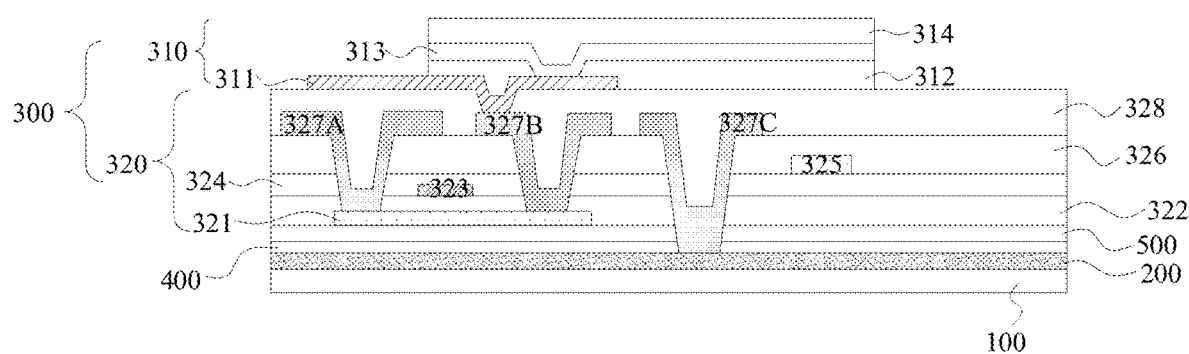
FIG. 3 shows a schematic diagram of a structure of a display substrate according to an embodiment of the present application.
Figure 4:
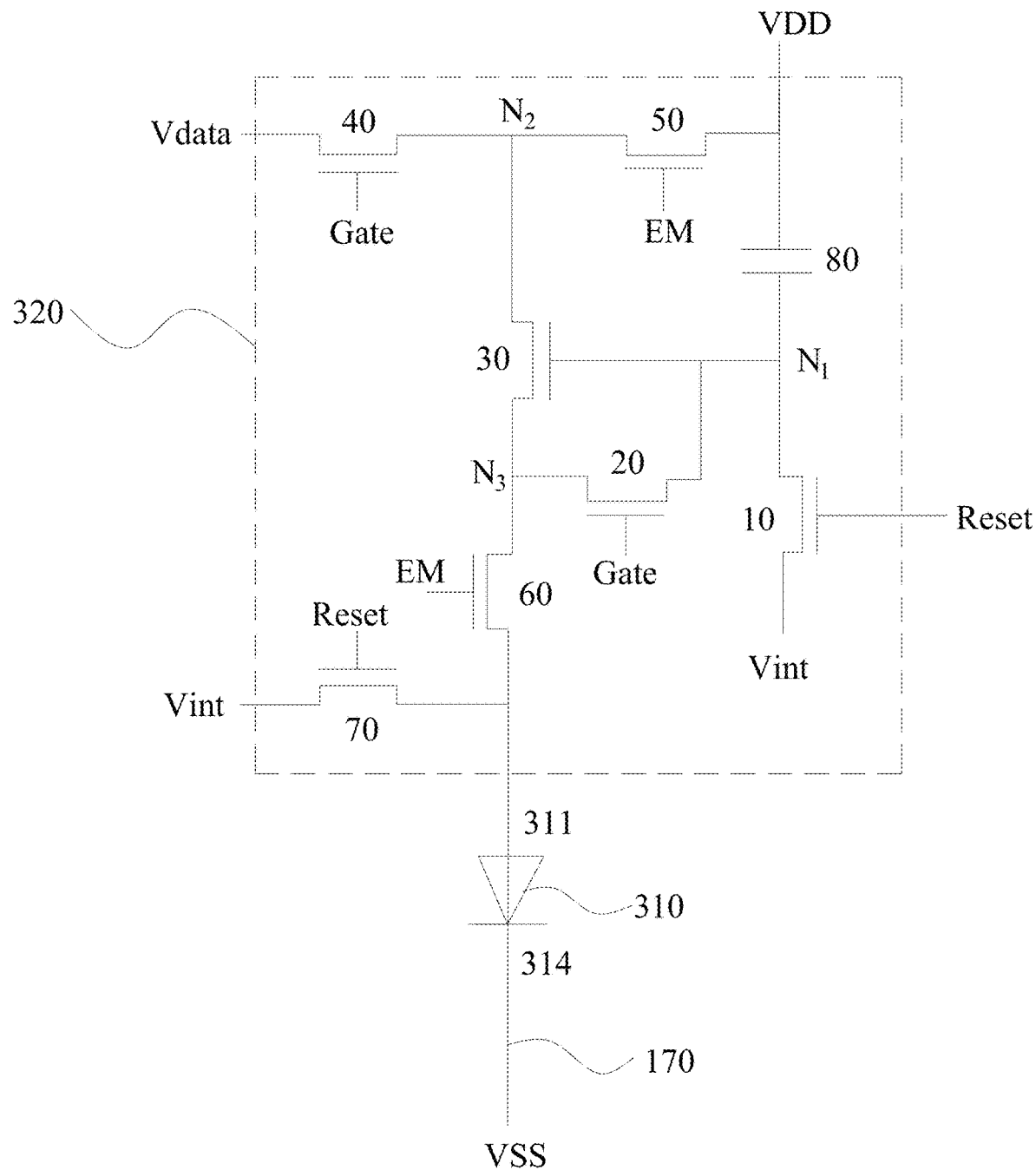
FIG. 4 shows a schematic diagram of a connection relationship between various structures in a sub-pixel according to an embodiment of the present application.

According to an embodiment of the present application, referring to FIG. 3, the sub-pixel 300 includes a light emitting element 310 and a pixel circuit structure 320, wherein the light emitting element 310 is located at one side of the pixel circuit structure 320 away from the base substrate 100, the light emitting element 310 is an organic light emitting diode, the organic light emitting diode includes an anode, a light emitting layer, and a cathode. Referring to FIG. 4, the pixel circuit structure 320 may include a storage capacitor portion 80 and multiple thin film transistors (such as a first thin film transistor 10, a second thin film transistor 20, a third thin film transistor 30, a fourth thin film transistor 40, a fifth thin film transistor 50, a sixth thin film transistor 60, a seventh thin film transistor 70), and electrodes in the thin film transistors, metal traces electrically connected between the various thin film transistors, and two electrode plates of the storage capacitor portion 80 are all light-opaque portions. In the present application, an orthographic projection of the light transmission hole 210 on the base substrate 100 has no overlapping region with an orthographic projection of a light-opaque portion of the pixel circuit structure 320 on the base substrate 100. Therefore, the light-opaque portion in the pixel circuit structure will not block light that needs to be injected into the light transmission hole, so as to achieve the fingerprint identification. Furthermore, in the present application, the orthographic projection of the light transmission hole 210 on the base substrate 100 has no overlapping region with an orthographic projection of an electrode of the light emitting element 310 on the base substrate 100, either. It is well known to those skilled in the art that, an anode of an organic light emitting diode may be formed by a transparent conductive material or a metal material, and a cathode may be formed by a transparent conductive material or a semitransparent conductive material. When the electrode of the light emitting element is formed by a metal material or a semitransparent conductive material, in the present application, since orthographic projections of the light transmission hole and the electrode of the light emitting element on the base substrate do not overlap, the electrode of the light emitting element will not block light that needs to be injected into the light transmission hole, so as to achieve the fingerprint identification. When the electrode of the light emitting element is formed by the transparent conductive material, orthographic projections of the light transmission hole and the electrode of the light emitting element on the base substrate are enabled not to overlap, which may avoid an influence of stray light on fingerprint identification. Specific position relationships between the light-opaque portion in the pixel circuit structure, the electrode in the light emitting element, and the light transmission hole will be described later in detail.

The inventor has discovered that the resolution of the display apparatus is continuously improved at present, which makes a size of the sub-pixel become smaller and smaller, while the pixel circuit structure in the sub-pixel includes a storage capacitor portion and multiple thin film transistors, and the pixel circuit structure occupies a relatively large area of the sub-pixel, which makes a design of the light transmission hole relatively much difficult. The present application not only disposes the light shielding layer in the display substrate, but also optimizes a position of the light transmission hole in the light shielding layer, so that a high-resolution display apparatus achieves Fingerprint on Display.

According to an embodiment of the present application, referring to FIG. 1C, the display substrate further includes a gate line 120, a reset control signal line 110, and a second initialization signal line 160B extending along the first direction, and in the second direction, the gate line 120, the reset control signal line 110, and the second initialization signal line 160B are sequentially arranged at one side of the light emitting control signal line 130 away from the first initialization signal line 160A, and the pixel circuit structure of the first sub-pixel 300A and the pixel circuit structure of the second sub-pixel 300B are respectively connected with the second initialization signal line 160B (refer to FIG. 1F). Therefore, it is convenient to reserve a region corresponding to the light transmission hole in the sub-pixel, and the traces for applying signals will not block light that needs to be injected into the light transmission hole, so as to achieve the fingerprint identification. The second direction intersects with the first direction, specifically, the second direction is perpendicular to the first direction, but it is not limited thereto.

It should be noted that, FIG. 1A is a schematic top view of a first active layer 321A, FIG. 1B is a schematic top view of a reset control signal line 110, a gate line 120, a light emitting control signal line 130, and a lower electrode plate 81 of a storage capacitor portion formed at one side of a first active layer 321A away from a base substrate, FIG. 1C is a schematic top view of a first initialization signal line 160A, a second initialization signal line 160B, and an upper electrode plate 82 of a storage capacitor portion formed at one side of a reset control signal line 110, a gate line 120, a light emitting control signal line 130, a lower electrode plate 81 of a storage capacitor portion away from a base substrate, FIG. 1D is a schematic diagram of disposing via holes on a first initialization signal line 160A, a second initialization signal line 160B, a first active layer 321A, an upper electrode plate 82 of a storage capacitor portion, and a lower electrode plate 81 of a storage capacitor, and FIG. 1E is a schematic top view of a first data line 140A, a second data line 140B, and a first power supply line 150 formed at one side of a first initialization signal line 160A, a second initialization signal line 160B, and an upper electrode plate 82 of a storage capacitor portion away from a base substrate. FIGS. 1A to 1E show a stacking sequence and a position relationship between various structures, and for a convenience of showing the position relationship of the above various structures, insulating layers between the various structures are not shown in FIGS. 1A to 1E, and the stacking relationship between the above various structures and the insulating layers may refer to FIG. 3.

According to an embodiment of the present application, referring to FIG. 3, the display substrate further includes a protection layer 400 and a buffer layer 500, the protection layer 400 covering the light shielding layer 200, and the buffer layer 500 being located between the protection layer 400 and the pixel circuit structure 320, the pixel circuit structure 320 includes an active layer 321, a first insulating layer 322, a first gate metal layer 323, a second insulating layer 324, a second gate metal layer 325, an interlayer dielectric layer 326, a source-drain metal layer 327, and a planarization layer 328, which are stacked sequentially at one side of the buffer layer 500 away from the protection layer 400, wherein a part of the source-drain metal layer 327 is connected with the active layer 321 through a via hole penetrating the interlayer dielectric layer 326, the second insulating layer 324, and the first insulating layer 322, forming a source 327A and a drain 327B of the thin film transistor, the light emitting element 310 includes an anode 311, a pixel definition layer 312, a light emitting layer 313, and a cathode 314 sequentially stacked at one side of the planarization layer 328 away from the interlayer dielectric layer 326, the anode 311 is connected with a source or a drain of the thin film transistor through a via hole penetrating the planarization layer 328, and the light emitting layer 313 is connected with the anode 311 through a via hole penetrating the pixel definition layer 312. The first gate metal layer 323 is used for forming a gate of the thin film transistor and a reset control signal line, a gate line, a light emitting control signal line, and a lower electrode plate of a storage capacitor portion. The second gate metal layer 325 is used for forming a first initialization signal line, a second initialization signal line, and an upper electrode plate of the storage capacitor portion. The source-drain metal layer 327 is used for forming a source, a drain of the thin film transistor, a first data line, a second data line, and a first power supply line. Specific constituent materials of the above various film layers are not particularly limited, and the technical personnel in the art may design according to commonly used materials. Herein, a material constituting the protection layer 400 may include silicon oxide. According to an embodiment of the present application, referring to FIG. 4, the display substrate further includes a second power supply line (VSS) 170, wherein the cathode 314 of the light emitting element 310 is connected with the second power supply line 170.

In the present application, each film layer located at one side of the light shielding layer away from the base substrate has a relatively high light transmittance (e.g., the protection layer 400, the buffer layer 500, the first insulating layer 322, the second insulating layer 324, the interlayer dielectric layer 326, the planarization layer 328, or the like). Therefore, it is only necessary to dispose a light transmission hole in the light shielding layer to ensure a stability of the display substrate on the basis of achieving the fingerprint identification.

Figure 2:
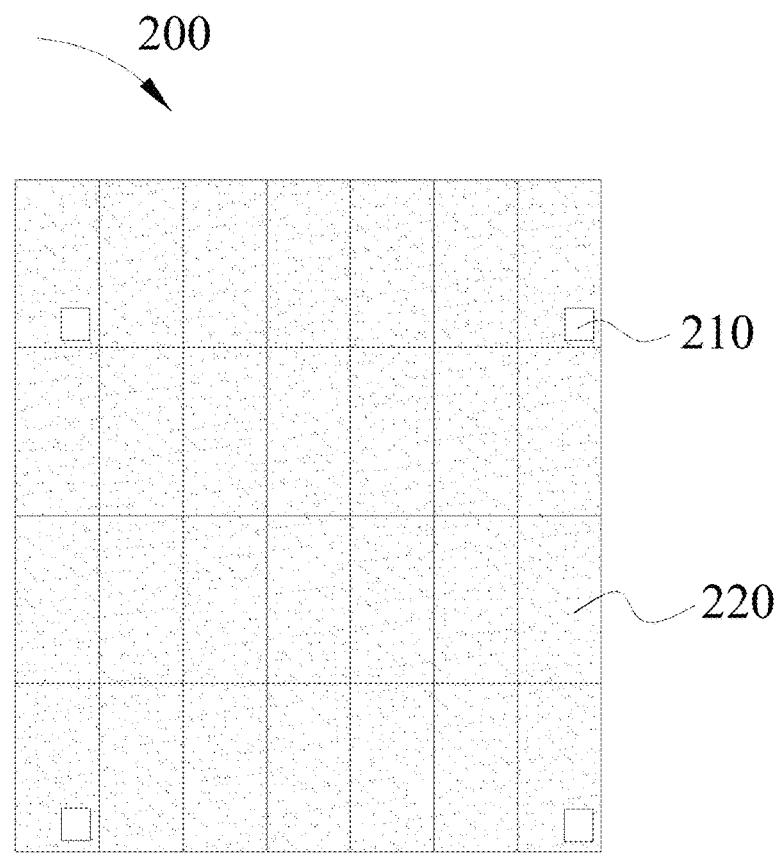
FIG. 2 shows a schematic top view of a light shielding layer according to an embodiment of the present application.

According to an embodiment of the present application, referring to FIG. 2, multiple light transmission holes 210 are provided in the light shielding layer 200, wherein the multiple light transmission holes 210 are arranged periodically (that is, distances between any two light transmission holes 210 are consistent in the light shielding layer 200), and an orthographic projection of each light transmission hole 210 on the base substrate 100 is located within a range of an orthographic projection of one sub-pixel 300 on the base substrate 100 (e.g., 220 shown in FIG. 2).

It should be noted that, opening sizes of the multiple light transmission holes in the light shielding layer are consistent. An opening shape of a light transmission hole is not particularly limited, for example, according to an embodiment of the present application, the opening shape of the light transmission hole may be a square, whereby an imaging quality may be improved and relatively clear fingerprint information may be obtained.

A specific period of an arrangement of the light transmission holes is not particularly limited, and the technical personnel in the art may design according to a specific situation. For example, it may be designed according to a resolution of a product, a size of the sub-pixel, a thickness of each film layer at one side of the shielding layer away from the base substrate, and a dielectric constant. Specifically, one light transmission hole may be disposed in an 8×8 pixel unit array, or one light transmission hole may be disposed in a 12×12 pixel unit array. In the above period, there is no light transmission hole in the second sub-pixel adjacent to the first sub-pixel. It should be noted that, each pixel unit may include multiple sub-pixels, and the light transmission hole is disposed according to the position described above.

According to an embodiment of the present application, referring to FIG. 3, the display substrate further includes a connection electrode 327C connected with the light shielding layer 200, wherein the connection electrode 327C is formed by a part of the source-drain metal layer 327, the connection electrode 327C is connected with the light shielding layer 200 through a via hole penetrating the interlayer dielectric layer 326, the second insulating layer 324, the first insulating layer 322, the buffer layer 500, and the protection layer 400, and the connection electrode 327C may be connected with the second power supply line 170 (not shown in FIG. 3). Therefore, static electricity may be prevented from being formed in the light shielding layer.

Hereinafter, a connection relationship between various thin film transistors and the storage capacitor portion will be explained by taking the pixel circuit structure including seven thin film transistors and one storage capacitor portion (i.e., a 7T1C pixel circuit structure) as an example.

Referring to FIG. 4, the first thin film transistor 10 and the seventh thin film transistor 70 are reset control transistors, the second thin film transistor 20 is a threshold compensation transistor, the third thin film transistor 30 is a driving transistor, the fourth thin film transistor 40 is a data writing transistor, and the fifth thin film transistor 50 and the sixth thin film transistor 60 are light emitting control transistors.

Referring to FIG. 1B, a gate 13 of the first thin film transistor is connected with a reset control signal line 110, referring to FIGS. 1B and 1E, a source 11 of the first thin film transistor is connected with the second initialization signal line 160B via a first trace 1, referring to FIGS. 1D and 1E, the first trace 1 is connected with the source 11 of the first thin film transistor through a via hole 14, the first trace 1 is connected with the second initialization signal line 160B through a via hole 15, referring to FIGS. 1B and 1E, a drain 12 of the first thin film transistor is connected with a gate 33 of the third thin film transistor through a second trace 2, and referring to FIGS. 1D and 1E, the second trace 2 is connected with the drain 12 of the first thin film transistor through a via hole 24, and the second trace 2 is connected with the gate 33 of the third thin film transistor through a via hole 25. Referring to FIG. 1B, a gate 73 of the seventh thin film transistor is connected with the reset control signal line 110, and referring to FIGS. 1B and 1E, a source 71 of the seventh thin film transistor is connected with the second initialization signal line 160B through the first trace 1, and a drain 72 of the seventh thin film transistor is connected with the anode 311 of the light emitting element 310 (not shown in FIG. 1).

Referring to FIG. 1B, a gate 23 of the second thin film transistor is connected with the gate line 120, and referring to FIGS. 1B and 1E, a source 21 of the second thin film transistor is connected with a gate 33 of the third thin film transistor through a second trace 2, and a drain 22 of the second thin film transistor is connected with a drain 32 of the third thin film transistor.

Referring to FIG. 1B, a gate 43 of the fourth thin film transistor is connected with the gate line 120, and referring to FIG. 1E, a source 41 of the fourth thin film transistor is connected with the first data line 140A through a via hole 44, and a drain 42 of the fourth thin film transistor is connected with a source 31 of the third thin film transistor (refer to FIG. 1B).

Referring to FIG. 1B, a gate 53 of the fifth thin film transistor is connected with the light emitting control signal line 130, and referring to FIG. 1E, a source 51 of the fifth thin film transistor is connected with the first power supply line 150 through a via hole 54, and a drain 52 of the fifth thin film transistor is connected with the source 31 of the third thin film transistor (refer to FIG. 1B) (i.e., the source of the third thin film transistor, the drain of the fourth thin film transistor, and the drain of the fifth thin film transistor are connected to a node N2 (refer to FIG. 4)). Referring to FIG. 1B, a gate 63 of the sixth thin film transistor is connected with the light emitting control signal line 130, a source 61 of the sixth thin film transistor is connected with the drain 32 of the third thin film transistor (i.e., the drain electrode of the second thin film transistor, the drain electrode of the third thin film transistor, and the source electrode of the sixth thin film transistor are connected to a node N3 (refer to FIG. 4)), and referring to FIG. 1E, a drain 62 of the sixth thin film transistor is connected with the anode 311 of the light emitting element 310 through a via hole 64.

Referring to FIGS. 1B and 1E, the lower electrode plate 81 (refer to FIG. 1B) of the storage capacitor portion 80 is connected with the source 21 of the second thin film transistor through a second trace 2 (in FIG. 1E, a position at which the lower electrode plate 81 is connected with the second trace 2 is a position at which the gate 33 of the third thin film transistor is connected with the second trace 2) (i.e., the source of the second thin film transistor, the gate of the third thin film transistor, and the lower electrode plate of the storage capacitor portion are connected to a node N1 (refer to FIG. 4)), and referring to FIGS. 1C and 1E, the upper electrode plate 82 of the storage capacitor portion 80 is connected with the first power supply line 150, and the upper electrode plate 82 may be connected with the first power supply line 150 through two via holes (such as via holes 84 and 85 shown in FIGS. 1D and 1E) to improve an electrical connection performance between the upper electrode plate and the first power supply line.

Referring to FIG. 4, the reset control signal line is used for applying a Reset signal to the first thin film transistor 10 and the seventh thin film transistor 70, the gate line is used for applying a Gate signal to the fourth thin film transistor 40 and the second thin film transistor 20, the light emitting control signal line is used for applying an EM signal to the fifth thin film transistor 50 and the sixth thin film transistor 60, the first data line is used for applying a Vdata signal to the fourth thin film transistor 40, the first power supply line is used for applying a VDD signal to the fifth thin film transistor 50, and the second initialization signal line is used for applying a Vint signal to the first thin film transistor 10 and the second thin film transistor 70.

According to an embodiment of the present application, referring to FIGS. 1C, 1D, and 1E, the display substrate further includes a connection portion 90, wherein the connection portion 90 is connected with the first power supply line 150 through a via hole 91. Therefore, the connection portion may prevent the first data line from causing a signal interference with the first power supply line.

In order to facilitate understanding, a working principle of a 7T1C pixel compensation circuit is briefly explained below first.

Figure 7:
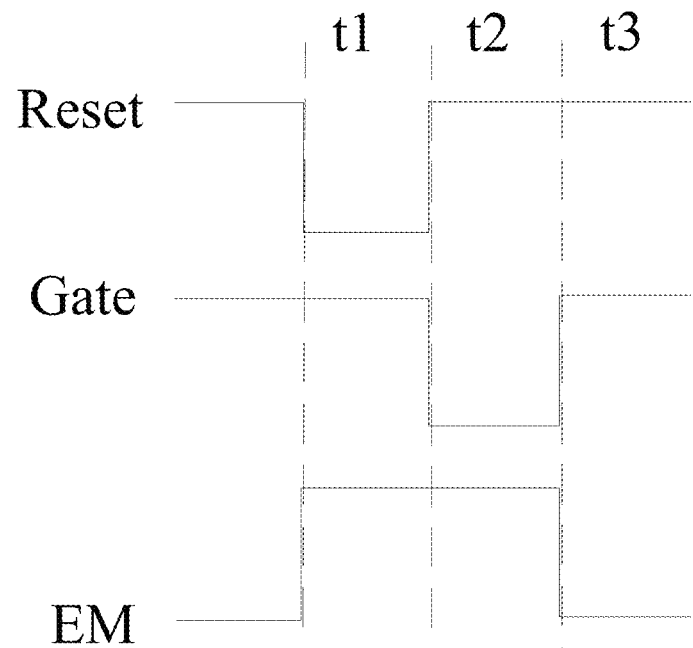
FIG. 7 shows a working principle diagram of a 7T1C pixel compensation circuit.

A working time sequence of the 7T1C pixel compensation circuit is divided into a reset stage, a sampling stage, and a light emitting stage, completing a compensation to a pixel threshold voltage (Vth). Refer to FIG. 7.

In a t1 stage (that is, the reset stage), the Reset signal is at a low level. The first thin film transistor is turned on, and the Vint signal initializes the N1 point, at this time a potential of the N1 point is Vint, and the third thin film transistor is turned on. When the seventh thin film transistor is turned on, Vint reduces a voltage difference between the anode and cathode of the light emitting element, reduces a brightness of the light emitting element at a low gray tone, and improves a contrast of pixels.

In a t2 stage (that is, the sampling stage), the Gate signal is at a low level. The fourth thin film transistor is turned on, at this time a potential of the N2 point is Vdata, and a data signal voltage is written into the N2 point. The second thin film transistor is turned on, a connection of the third thin film transistor is sampled, the potential of the N1 point is raised to Vdata+Vth, the third thin film transistor is gradually changed from an ON state to an OFF state, and compensation is provided to a threshold voltage of the third thin film transistor.

In a t3 stage (i.e. the light emitting stage), the EM signal is at a low level. The fifth thin film transistor and the sixth thin film transistor are turned on, at this time the potential of the N2 point is VDD, the third thin film transistor outputs a driving current, and the light emitting element emits light.

The compensation is provided to the threshold voltage of the thin film transistor in the sampling stage to eliminate an influence of a threshold voltage difference of driving thin film transistors (i.e. the third thin film transistors) of different pixels on a uniformity of a display brightness.

In the present application, a width of the light transmission hole 210 in the first direction may be less than ⅓ of a distance between the first data line and the second data line, or a width of the light transmission hole 210 in the first direction may be ⅓ to ½ of a distance between the first data line and the second data line, or a width of the light transmission hole 210 in the first direction may be greater than ½ of a distance between the first data line and the second data line. Details are as follows.

According to some embodiments of the present application, referring to FIG. 1E, in the first direction, a width of the light transmission hole 210 may be less than ⅓ of a distance between the first data line 140A and the second data line 140B, at this time the pixel circuit structure of the first sub-pixel 300A includes a first light emitting control transistor (i.e., the fifth thin film transistor 50) and a second light emitting control transistor (i.e., the sixth thin film transistor 60), a first electrode (e.g. a source 51) of the first light emitting control transistor is located at a first side of the light emitting control signal line 130, a second electrode (e.g. a drain 52) of the first light emitting control transistor is located at a second side of the light emitting control signal line 130, a second electrode (e.g. a drain 62) of the second light emitting control transistor is located at the first side of the light emitting control signal line 130, a first electrode (e.g. a source 61) of the second light emitting control transistor is located at the second side of the light emitting control signal line 130, the first side and the second side are two opposite sides of the light emitting control signal line 130, and the light transmission hole 210 is located between the first electrode 51 of the first light emitting control transistor and the second electrode 62 of the second light emitting control transistor. Therefore, source-drain of the light emitting control transistor will not block the light transmission hole. It can be understood by those skilled in the art that, the driving transistor, the reset control transistor, the threshold compensation transistor, the data writing transistor, and the storage capacitor portion are all located at one side of the light emitting control signal line away from the first initialization signal line, so that source-drain of the above transistor and the storage capacitor portion will not block the light transmission hole, either.

Figure 1G:
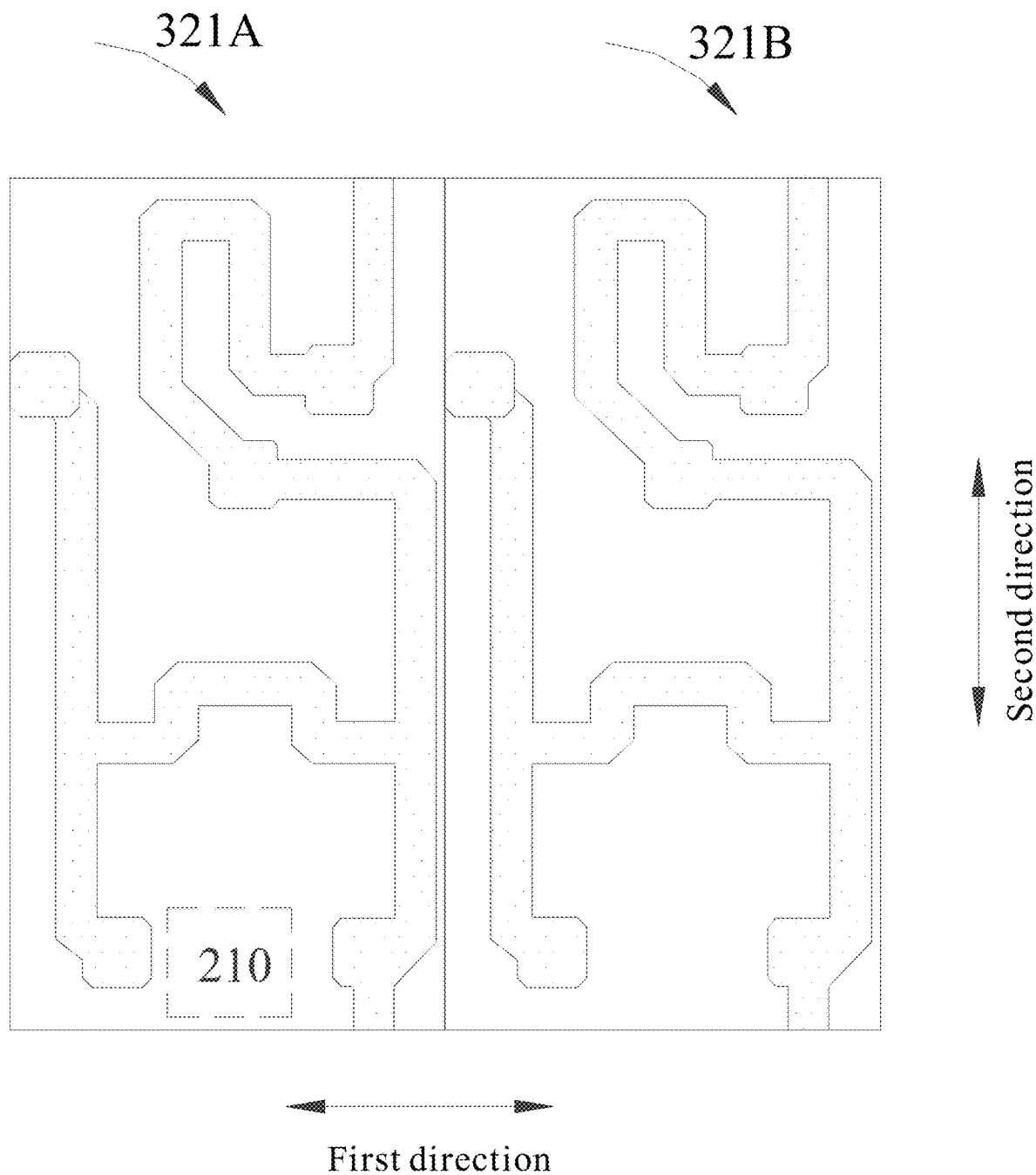
FIG. 1G shows a schematic top view of a first active layer and a second active layer according to an embodiment of the present application.

Referring to FIG. 1F, the light transmission hole 210 is provided within the first sub-pixel 300A, the light transmission hole 210 is not provided within the second sub-pixel 300B, when a width of the light transmission hole 210 is less than ⅓ of a distance between the first data line 140A and the second data line 140B, because of a relatively small size of the light transmission hole, positions of the reset control signal line, the gate line, the light emitting control signal line, the first data line, the first power supply line, and various elements in the pixel circuit structure within the first sub-pixel may be consistent with positions of them within the second sub-pixel (refer to FIG. 1F), and a size of the first active layer 321A is consistent with a size of the second active layer 321B, and a position of the first active layer 321A within the first sub-pixel is consistent with a position of the second active layer 321B within the second sub-pixel (refer to FIG. 1G).

It should be noted that, the "first active layer" is an active layer in a region enclosed by the second initialization signal line, the first initialization signal line, the first data line, and the second data line, and the "second active layer" is an active layer within a region enclosed by the second initialization signal line, the first initialization signal line, the second data line, and the third data line 140C (refer to FIG. 1F). Herein, the third data line is a data line extending along the second direction and connected with a pixel circuit structure of a third sub-pixel, wherein the third sub-pixel is a sub-pixel adjacent to the second sub-pixel in the first direction (refer to FIG. 1F, in which only the third data line in the third sub-pixel is shown).

Figure 5A:
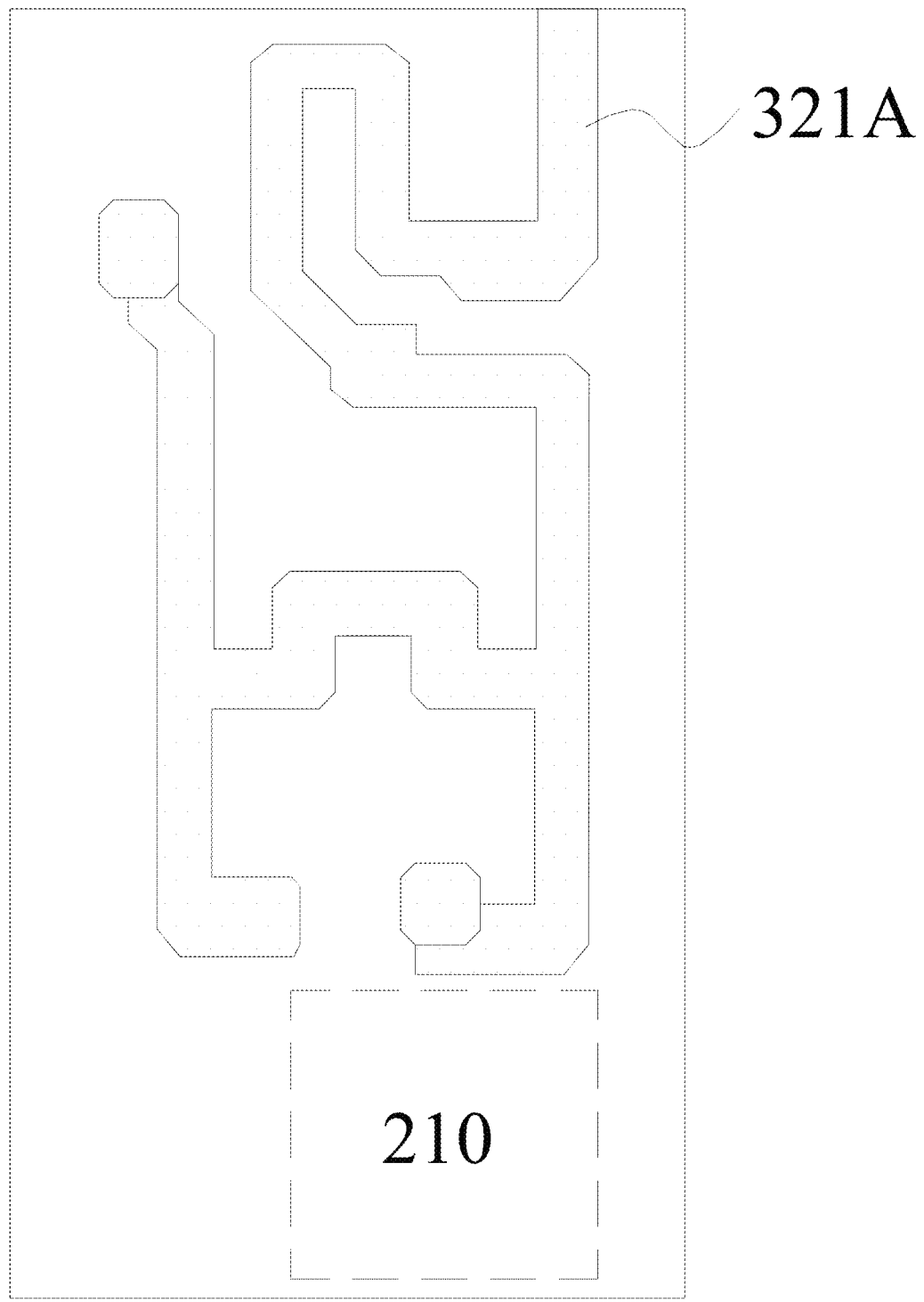
FIG. 5A shows a schematic top view of a first active layer according to another embodiment of the present application.
Figure 5B:
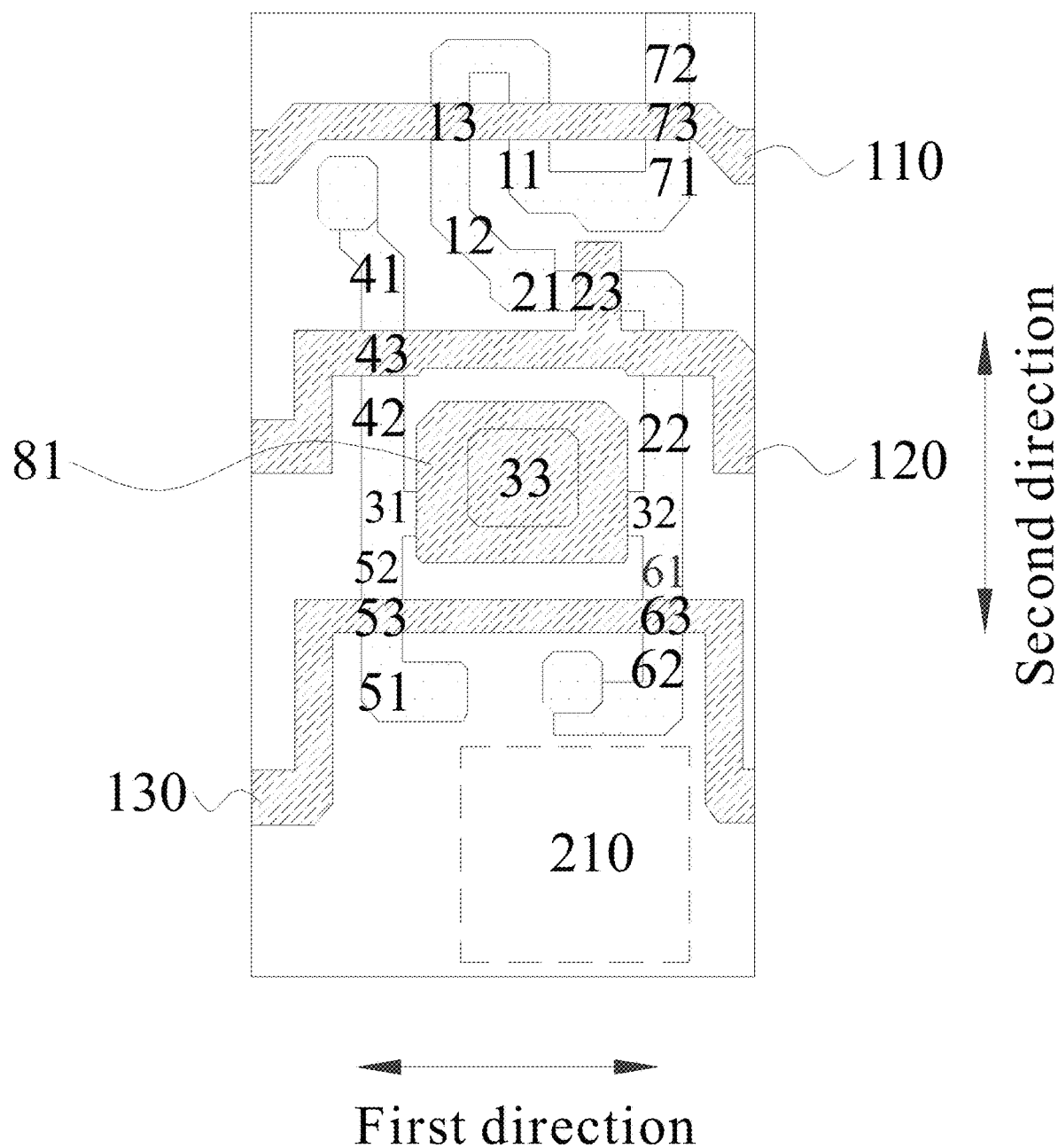
FIG. 5B shows a schematic top view of a reset control signal line, a gate line, a light emitting control signal line, and a lower electrode plate of a storage capacitor portion formed at one side of a first active layer away from a base substrate according to another embodiment of the present application.
Figure 5C:
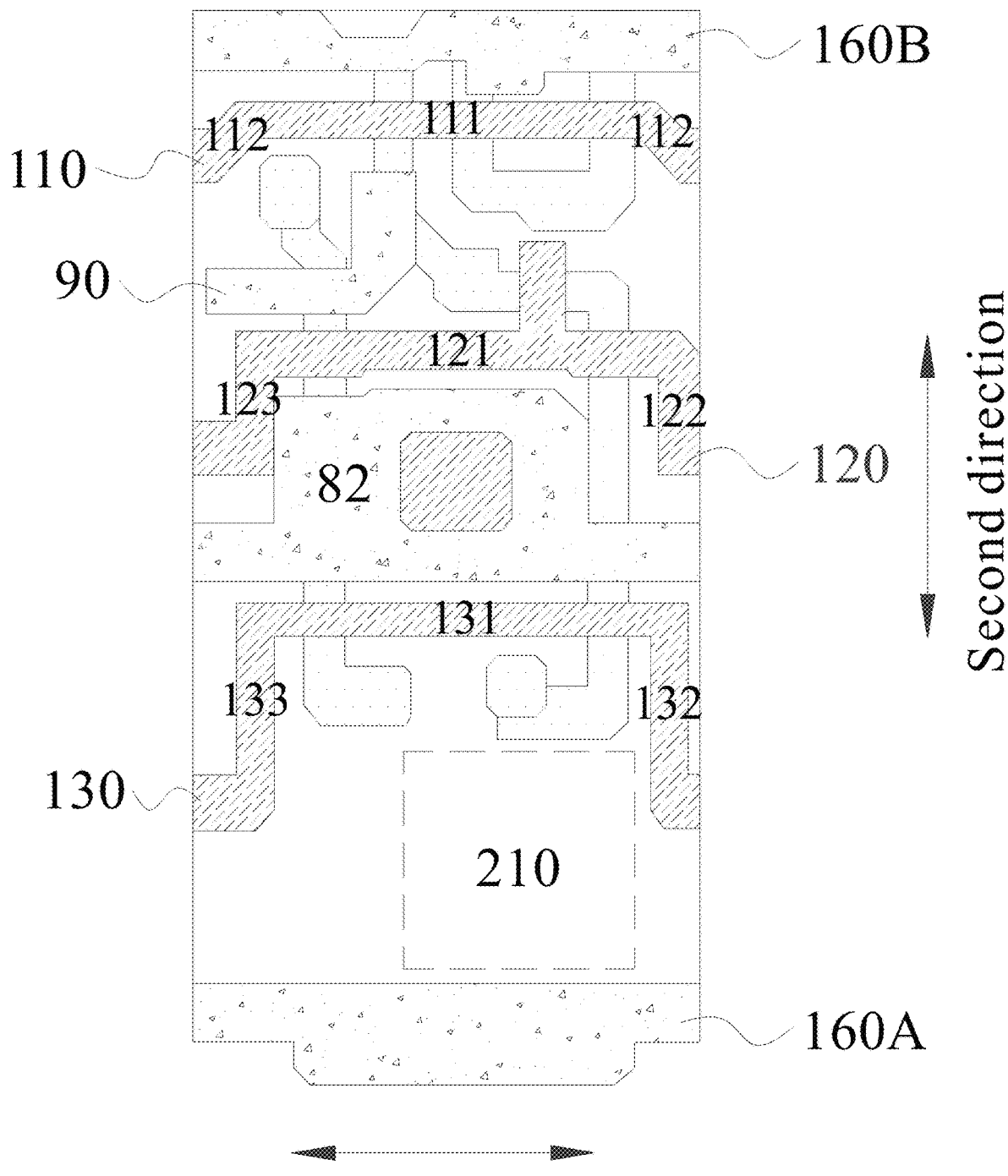
FIG. 5C shows a schematic top view of a first initialization signal line, a second initialization signal line, and an upper electrode plate of a storage capacitor portion formed at one side of a reset control signal line, a gate line, a light emitting control signal line, a lower electrode plate of a storage capacitor portion away from a base substrate according to another embodiment of the present application.
Figure 5D:
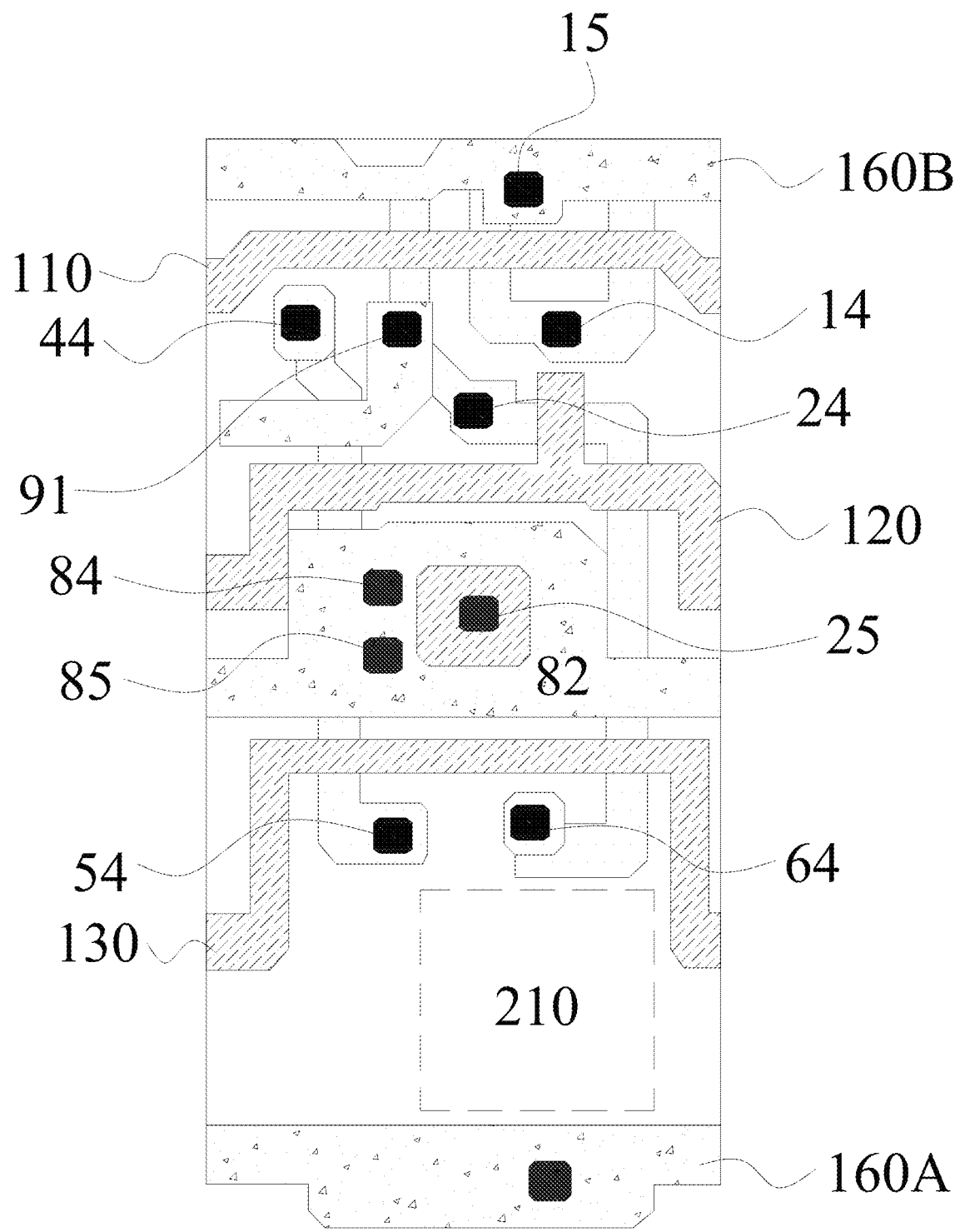
FIG. 5D shows a schematic diagram of disposing via holes on a first initialization signal line, a second initialization signal line, a first active layer, an upper electrode plate of a storage capacitor portion, and a lower electrode plate of a storage capacitor according to another embodiment of the present application.
Figure 5E:
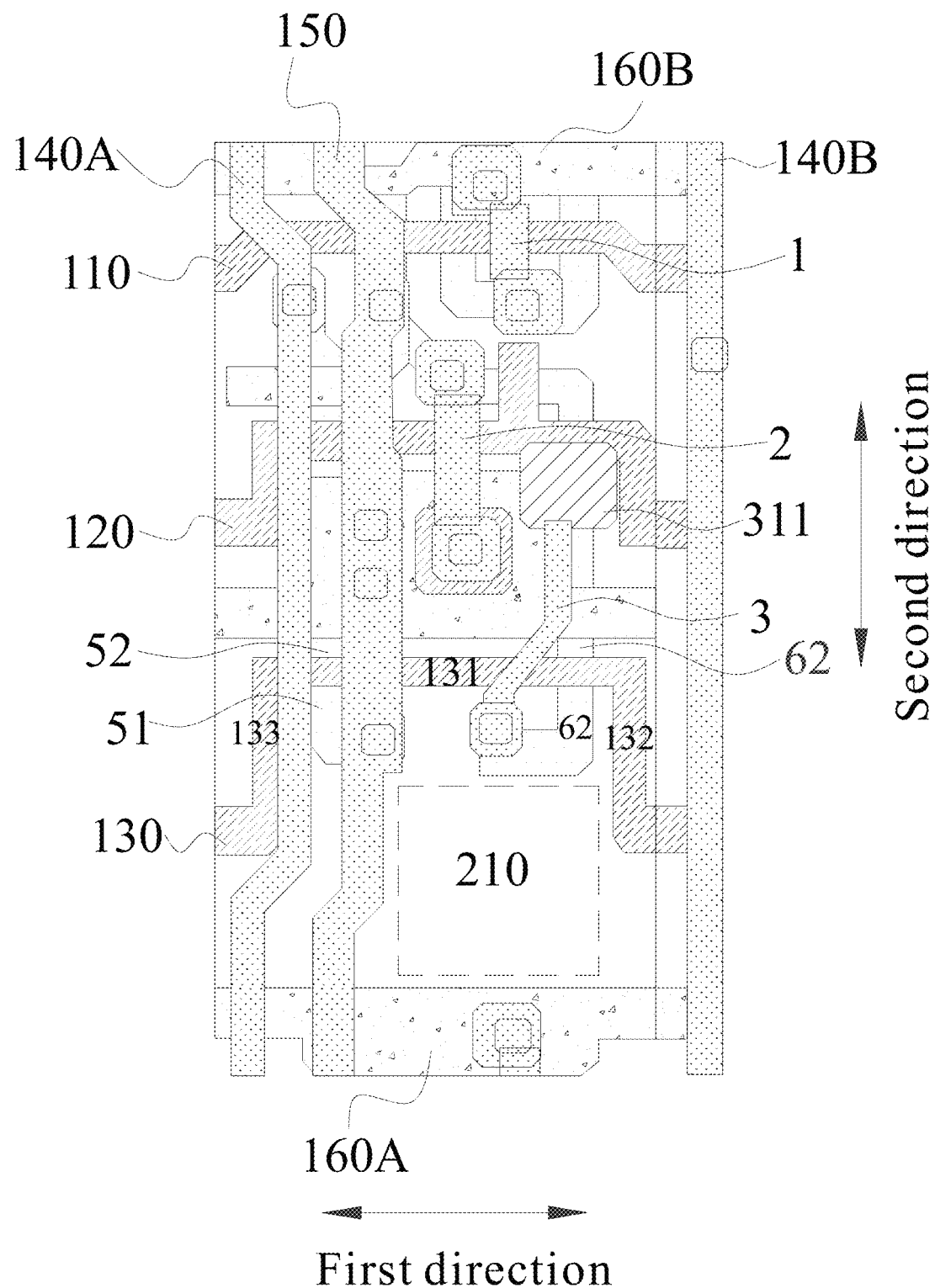
FIG. 5E shows a schematic top view of a first data line, a second data line, and a first power supply line formed at one side of a first initialization signal line, a second initialization signal line, and an upper electrode plate of a storage capacitor portion away from a base substrate according to another embodiment of the present application.

According to some other embodiments of the present application, refer to FIGS. 5A to 5E, wherein FIG. 5A is a schematic top view of a first active layer 321A, FIG. 5B is a schematic top view of a reset control signal line 110, a gate line 120, a light emitting control signal line 130, and a lower electrode plate 81 of a storage capacitor portion formed at one side of a first active layer 321A away from a base substrate, FIG. 5C is a schematic top view of a first initialization signal line 160A, a second initialization signal line 160B, and an upper electrode plate 82 of the storage capacitor portion formed at one side of a reset control signal line 110, a gate line 120, a light emitting control signal line 130, a lower electrode plate 81 of a storage capacitor portion away from a base substrate, FIG. 5D is a schematic diagram of disposing via holes on a first initialization signal line 160A, a second initialization signal line 160B, a first active layer 321A, an upper electrode plate 82 of a storage capacitor portion, and a lower electrode plate 81 of a storage capacitor portion, and FIG. 5E is a schematic top view of a first data line 140A, a second data line 140B, and a first power supply line 150 formed at one side of a first initialization signal line 160A, a second initialization signal line 160B, and an upper electrode plate 82 of a storage capacitor portion away from a base substrate. FIGS. 5A to 5E show a stacking sequence and a position relationship between various structures, and for a convenience of showing the position relationship of the above various structures, insulating layers between the various structures are not shown in FIGS. 5A to 5E, and the stacking relationship between the above various structures and the insulating layers may refer to FIG. 3.

Referring to FIG. 5E, in the first direction, a width of the light transmission hole 210 may be ⅓ to ½ of a distance between the first data line 140A and the second data line 140B, at this time referring to FIGS. 5C and 5E, the light emitting control signal line 130 includes a first sub-portion 131, a second sub-portion 132, and a third sub-portion 133, the first sub-portion 131 being located between the second sub-portion 132 and the third sub-portion 133, the first sub-portion 131 extending along the first direction, the second sub-portion 132 and the third sub-portion 133 extending along the second direction, and in the first direction, at least part of the second sub-portion 132 being located between the first power supply line 150 and the second data line 140B, the pixel circuit structure of the first sub-pixel 300A includes a first light emitting control transistor (i.e., the fifth thin film transistor 50) and a second light emitting control transistor (i.e., the sixth thin film transistor 60), a first electrode (e.g. a source 51) of the first light emitting control transistor being located at a first side of the first sub-portion 131, a second electrode (e.g. a drain 52) of the first light emitting control transistor being located at a second side of the first sub-portion 131, a second electrode (e.g. a drain 62) of the second light emitting control transistor being located at the first side of the first sub-portion 131, a first electrode (e.g. a source 61) of the second light emitting control transistor being located at the second side of the first sub-portion 131, and the first side and the second side being two opposite sides of the first sub-portion 131, and the light transmission hole 210 is located within a region enclosed by the first power supply line 150, the second sub-portion 132, the second electrode 62 of the second light emitting control transistor, the first electrode 51 of the first light emitting control transistor, and the first initialization signal line 160A.

Further, referring to FIG. 5E, in the first direction, at least part of the third sub-portion 133 is located at one side of the first data line 140A away from the first power supply line 150, and the second sub-portion 132 is located at one side of the second electrode 62 of the second light emitting control transistor away from the first power supply line 150. Therefore, source-drain of the light emitting control transistor will not block the light transmission hole, so that source-drain of the driving transistor, the reset control transistor, the threshold compensation transistor, and the data writing transistor, and the storage capacitor portion will not block the light transmission hole.

It should be noted that, since the light emitting control signal line is not disposed on a same layer as the first data line, and the first power supply line, "in the first direction, at least part of the third sub-portion is located at one side of the first data line away from the first power supply line" means that an orthographic projection of at least part of the third sub-portion on the base substrate is located at one side of an orthographic projection of the first data line on the base substrate away from an orthographic projection of the first power supply line on the base substrate. Similarly, "in the first direction, at least part of the second sub-portion is located between the first power supply line and the second data line" means that an orthographic projection of at least part of the second sub-portion on the base substrate is located between an orthographic projection of the first power supply line on the base substrate and an orthographic projection of the second data line on the base substrate.

In the present embodiment, a size of the light transmission hole may be enlarged to further improve the sensitivity of the fingerprint identification, and it may be applied to a display apparatus with a sub-pixel with a relatively small size. A traditional fingerprint identification display apparatus usually sacrifices the resolution and disposes the light transmission hole with a relatively large opening size in a sub-pixel with a relatively large size, that is to say, the traditional fingerprint identification display apparatus usually disposes the light transmission hole with the relatively large opening size in a display apparatus with a relatively low resolution. However, the present application may dispose the light transmission hole with the relatively large opening size in the sub-pixel with the relatively small size, and thus, it may be suitable for a display apparatus with a relatively high resolution, so that the display apparatus can give consideration to both a high resolution and a high sensitivity of the fingerprint identification.

Figure 5F:
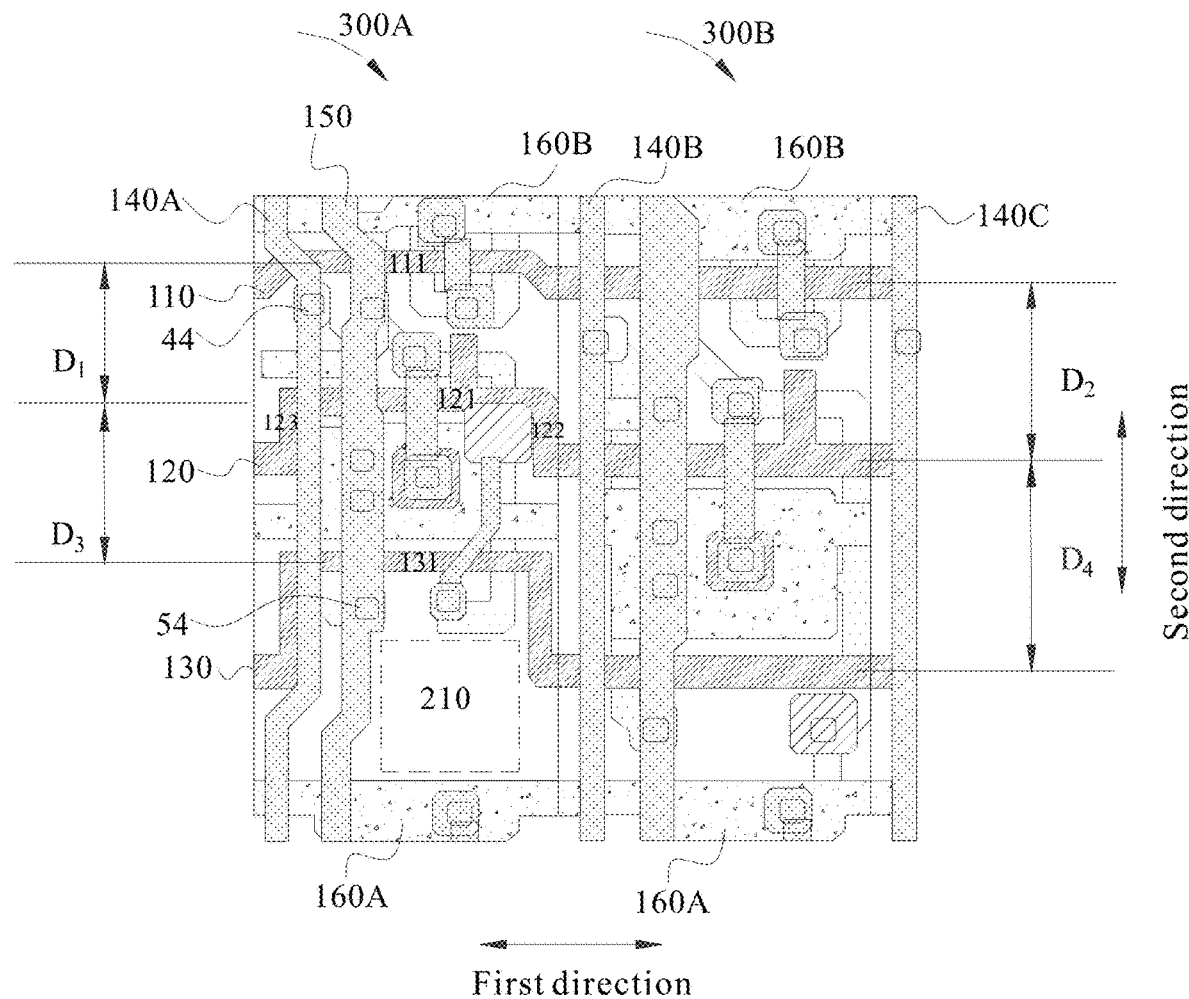
FIG. 5F shows a schematic diagram of a structure of a first sub-pixel and a second sub-pixel according to another embodiment of the present application.

More specifically, referring to FIG. 5F, the light transmission hole 210 is provided with the first sub-pixel 300A, no light transmission hole is provided with the second sub-pixel 300B, referring to FIG. 5C, the reset control signal line 110 includes a fourth sub-portion 111 extending along the first direction and bent portions 112 located at two ends of the fourth sub-portion 111, referring to FIG. 5F, at least part of the fourth sub-portion 111 is located between the first data line 140A and the second data line 140B, referring to FIGS. 5C and 5F, the gate line 120 includes a fifth sub-portion 121, a sixth sub-portion 122, and a seventh sub-portion 123, the fifth sub-portion 121 being located between the sixth sub-portion 122 and the seventh sub-portion 123, the fifth sub-portion 121 extending along the first direction, the sixth sub-portion 122 and the seventh sub-portion 123 extending along the second direction, and in the first direction, and at least part of the sixth sub-portion 122 being located between the first data line 140A and the second data line 140B, the multiple sub-pixels include a third sub-pixel (not shown in the figure) adjacent to the second sub-pixel 300B along the first direction, the third data line 140C extends along the second direction, and is connected with a pixel circuit structure of the third sub-pixel, parts of the reset control signal line 110, the gate line 120, and the light emitting control signal line 130 located between the second data line 140B and the third data line 140C all extend along the first direction (refer to FIG. 5F), wherein a distance between the fourth sub-portion 111 and the fifth sub-portion 121 is D1, a spacing between a part of the reset control signal line 110 located between the second data line 140B and the third data line 140C and a part of the gate line 120 located between the second data line 140B and the third data line 140C is D2, D1 is less than D2, a spacing between the fifth sub-portion 121 and the first sub-portion 131 is D3, a spacing between a part of the gate line 120 located between the second data line 140B and the third data line 140C and a part of the light emitting control signal line 130 located between the second data line 140B and the third data line 140C is D4, and D3 is less than D4. Therefore, by narrowing spacings between various signal lines within the first sub-pixel, a relatively large region is reserved corresponding to the light transmission hole.

Since the spacings between the signal lines becomes small, in the present embodiment, an area of the storage capacitor portion in the first sub-pixel also needs to be smaller than an area of the storage capacitor portion in the second sub-pixel.

Figure 5G:
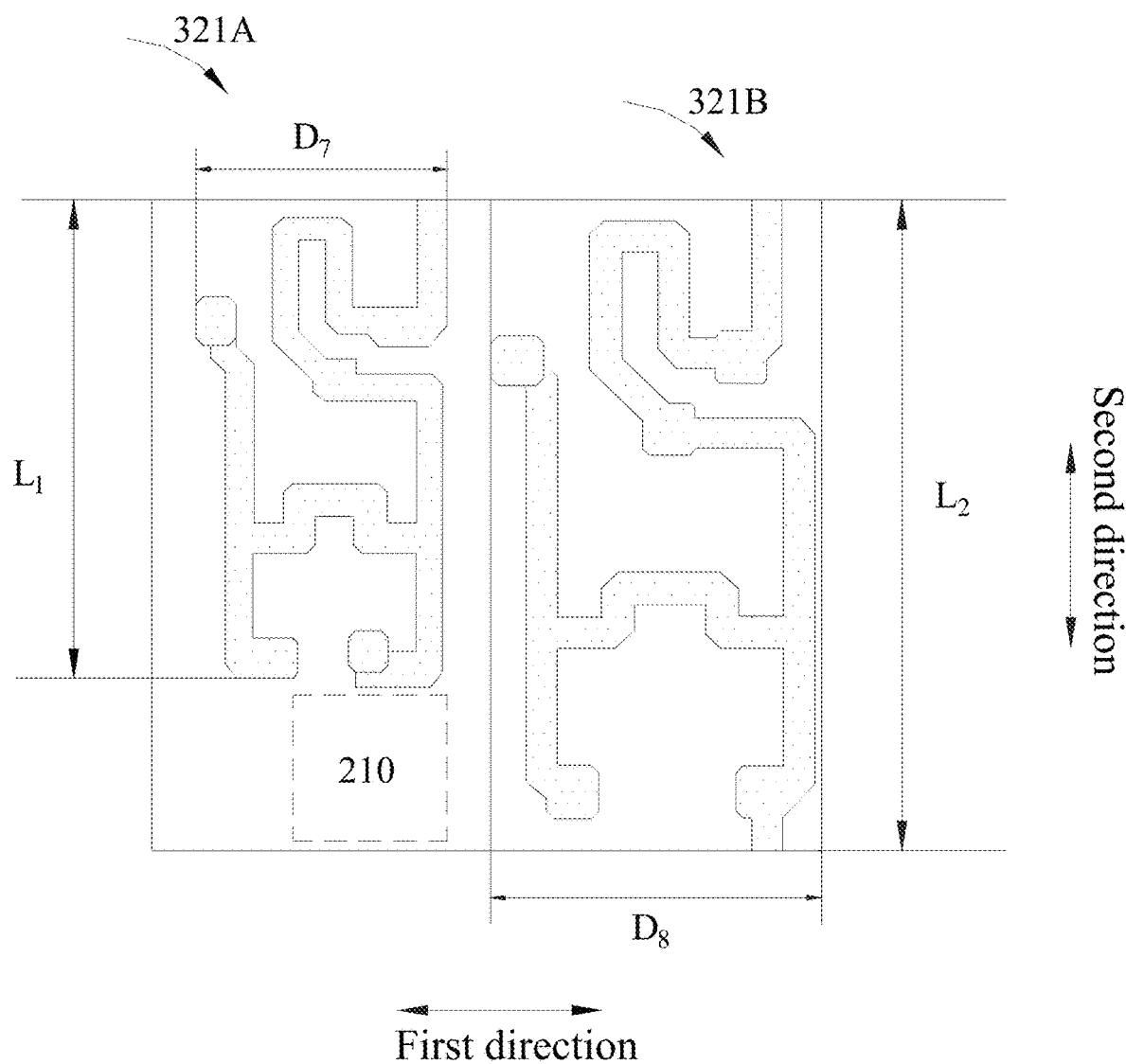
FIG. 5G shows a schematic top view of a first active layer and a second active layer according to another embodiment of the present application.

Further, referring to FIGS. 5F and 5G, an active layer in the pixel circuit structure of the first sub-pixel 300A is located within a region enclosed by the first initialization signal line 160A, the second initialization signal line 160B, the first data line 140A, and the second data line 140B, an active layer in the pixel circuit structure of the second sub-pixel 300B is located within a region enclosed by the first initialization signal line 160A, the second initialization signal line 160B, the second data line 140B, and the third data line 140C, the active layer in the first sub-pixel is a first active layer 321A, the active layer in the second sub-pixel is a second active layer 321B, wherein a width of the first active layer 321A is $D_7$, a width of the second active layer 321B is $D_8$, $D_7$ is less than $D_8$, a length of the first active layer 321A is $L_1$, a length of the second active layer 321B is $L_2$, and $L_1$ is less than $L_2$ (refer to FIG. 5G). Thus, by reducing a size of the first active layer, connections between source-drain of the thin film transistor and various signal lines are ensured.

It should be noted that, in the present embodiment, the first sub-pixel 300A normally emits light. Therefore, narrowing the above spacings between the signal lines and reducing the size of the first active layer both need to take the first sub-pixel 300A normally emitting light as a premise.

According to an embodiment of the present application, since the size of the first active layer becomes smaller, a position of a via hole 44 connecting the first data line 140A to the source of the fourth thin film transistor is moved, and a position of a via hole 54 connecting the first power supply line 150 to the source of the fifth thin film transistor is moved (refer to FIG. 5F). Therefore, parts of the first data line 140A and the first power supply line 150 connected with the pixel circuit structure of the first sub-pixel 300A may have a bent structure (refer to FIG. 5F), for example, parts of the first data line 140A and the first power supply line 150 connected with the pixel circuit structure of the first sub-pixel 300A are both bent toward one side close to the light transmission hole 210, so that the first data line 140A can apply a signal to the fourth thin film transistor 40, and the first power supply line 150 can apply a signal to the fifth thin film transistor 50.

According to an embodiment of the present application, when the width of the light transmission hole 210 is ⅓ to ½ of the distance between the first data line 140A and the second data line 140B, a ratio of a width of an active layer to a length of a gate of the thin film transistor in the first sub-pixel 300A is consistent with a ratio of a width of an active layer to a length of a gate of the thin film transistor in the second sub-pixel 300B. Therefore, a display brightness of the first sub-pixel and a display brightness of the second sub-pixel may be guaranteed to be consistent, and a uniformity of a brightness of a whole display screen may be guaranteed. It should be noted that, the length of the gate is a size of the gate in an extending direction of the gate, and the width of the active layer is a size of the active layer perpendicular to the extending direction of the gate.

According to an embodiment of the present application, when the width of the light transmission hole 210 is ⅓ to ½ of the distance between the first data line 140A and the second data line 140B, in the second direction, the anode 311 of the light emitting element in the first sub-pixel is located at one side of the first sub-portion 131 away from the second electrode 62 of the second light emitting control transistor (refer to FIG. 5E). That is, the light emitting element in the first sub-pixel 300A is moved to one side away from the light transmission hole 210 compared to the light emitting element in the second sub-pixel 300B to prevent the electrode of the light emitting element from blocking the light transmission hole, at this time the drain 62 of the sixth thin film transistor in the first sub-pixel 300A is connected with the anode 311 of the light emitting element through a third trace 3 (refer to FIG. 5E).

A light emitting color of the first sub-pixel described above is not particularly limited, for example, the first sub-pixel may be a sub-pixel emitting red light, or the first sub-pixel may be a sub-pixel emitting green light, or the first sub-pixel may be a sub-pixel emitting blue light. That is to say, when the width of the light transmission hole does not exceed ½ of a width of the sub-pixel, the light transmission hole may be disposed in a region corresponding to the sub-pixel emitting the red light in the light shielding layer, or may be disposed in a region corresponding to the sub-pixel emitting the green light in the light shielding layer, or may be disposed in a region corresponding to the sub-pixel emitting the blue light in the light shielding layer.

Figure 6A:
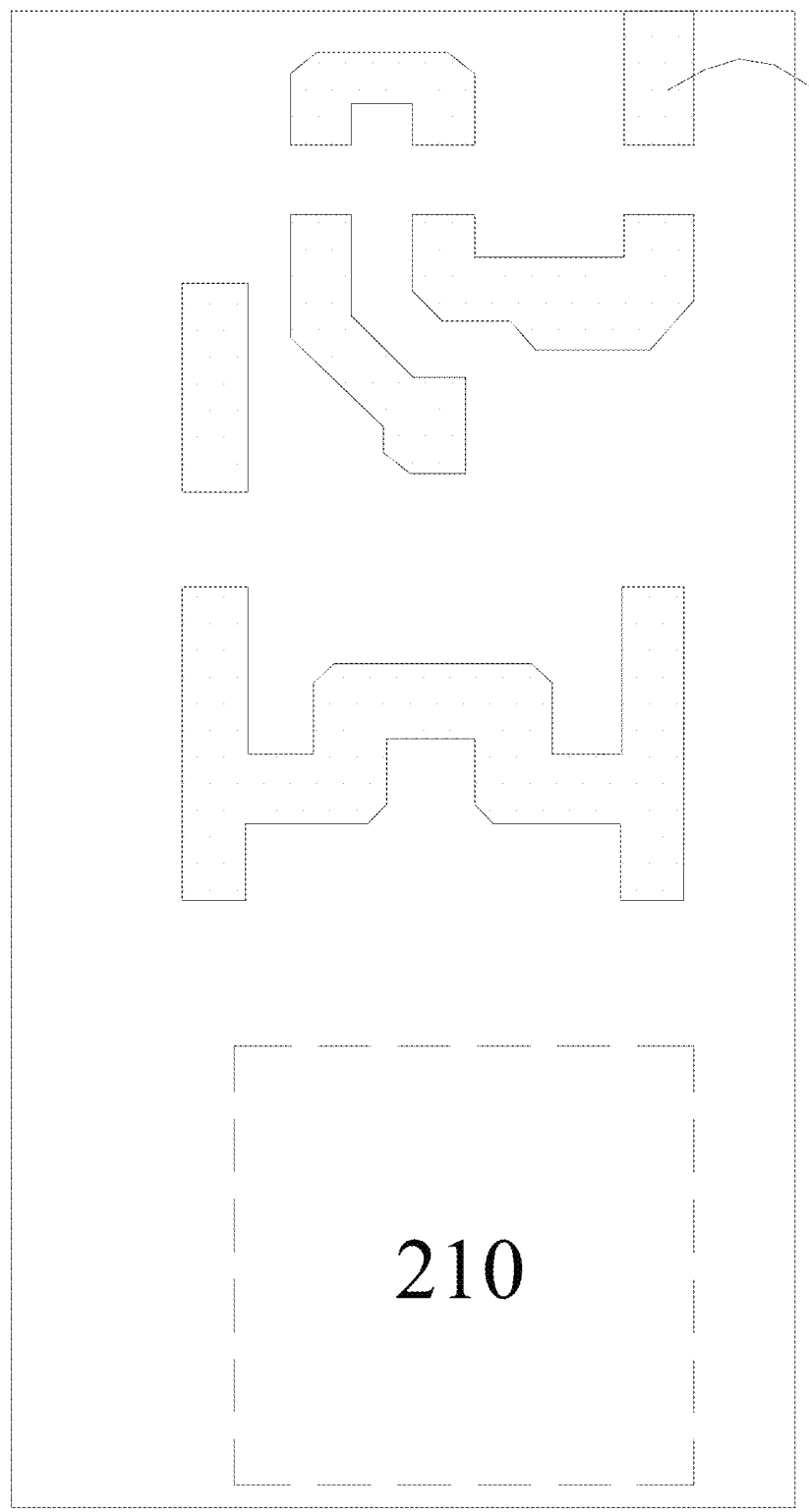
FIG. 6A shows a schematic top view of a first active layer according to another embodiment of the present application.
Figure 6B:
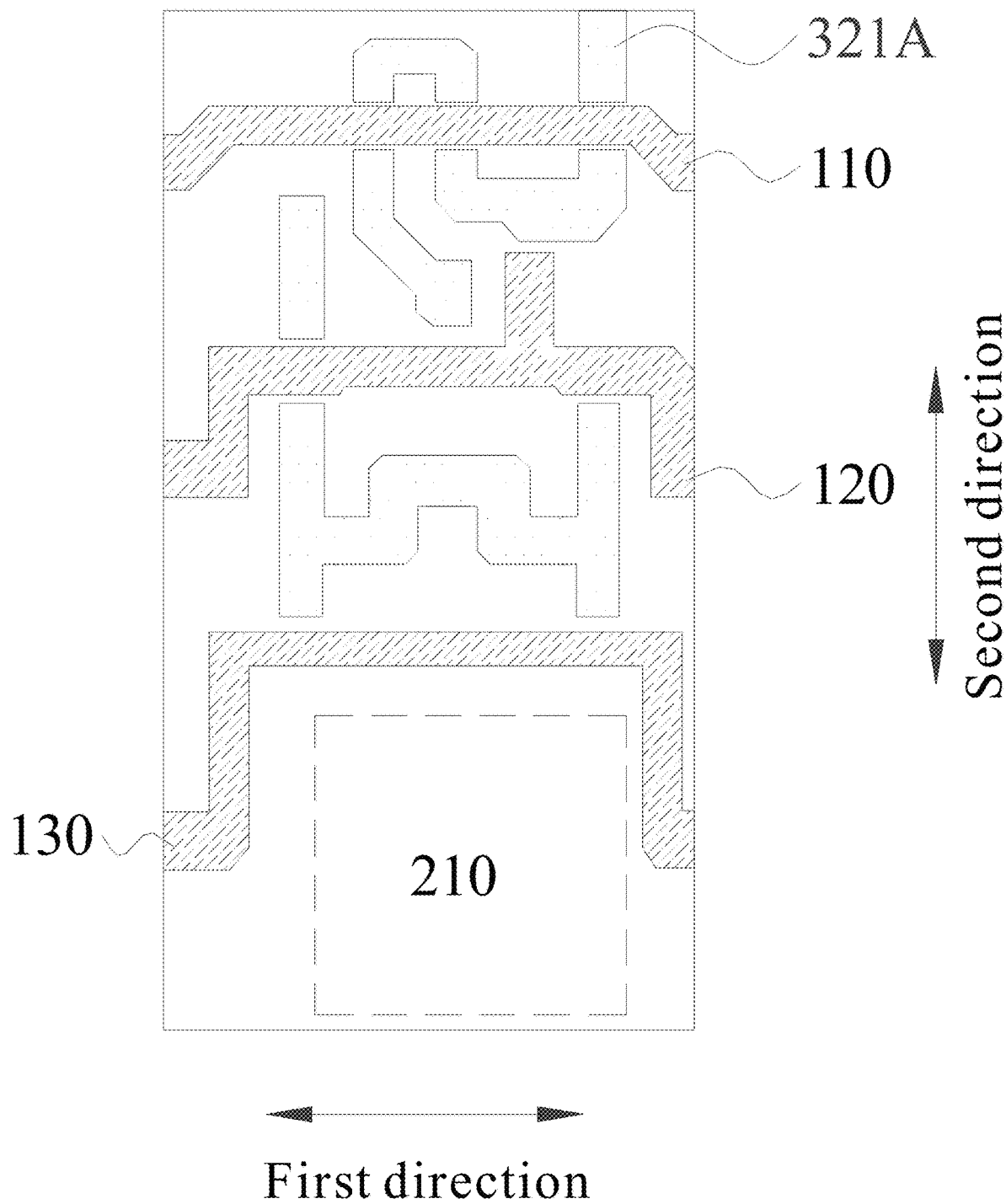
FIG. 6B shows a schematic top view of a reset control signal line, a gate line, and a light emitting control signal line formed at one side of a first active layer away from a base substrate according to another embodiment of the present application.
Figure 6C:
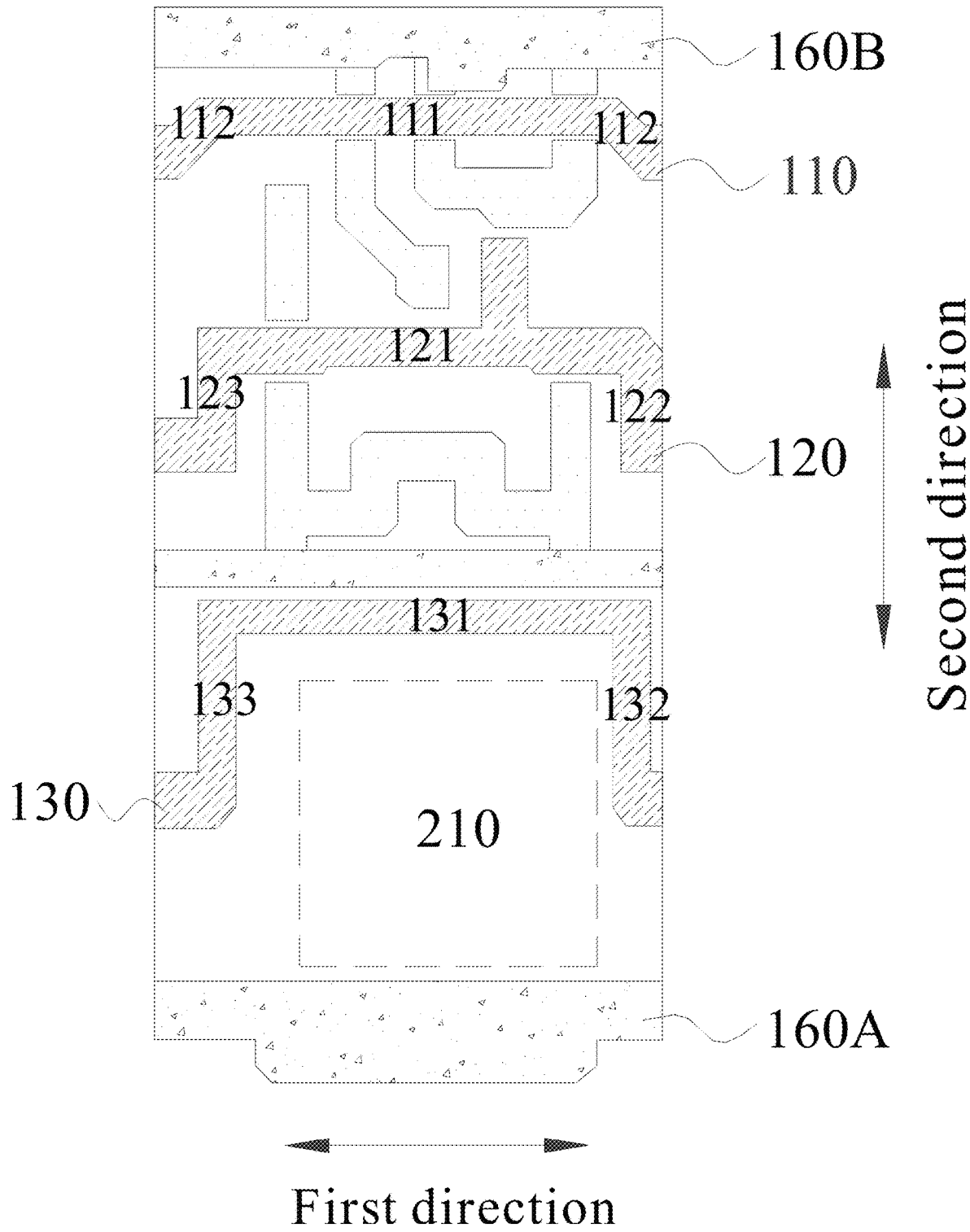
FIG. 6C shows a schematic top view of a first initialization signal line, and a second initialization signal line formed at one side of a reset control signal line, a gate line, and a light emitting control signal line away from a base substrate according to another embodiment of the present application.
Figure 6D:
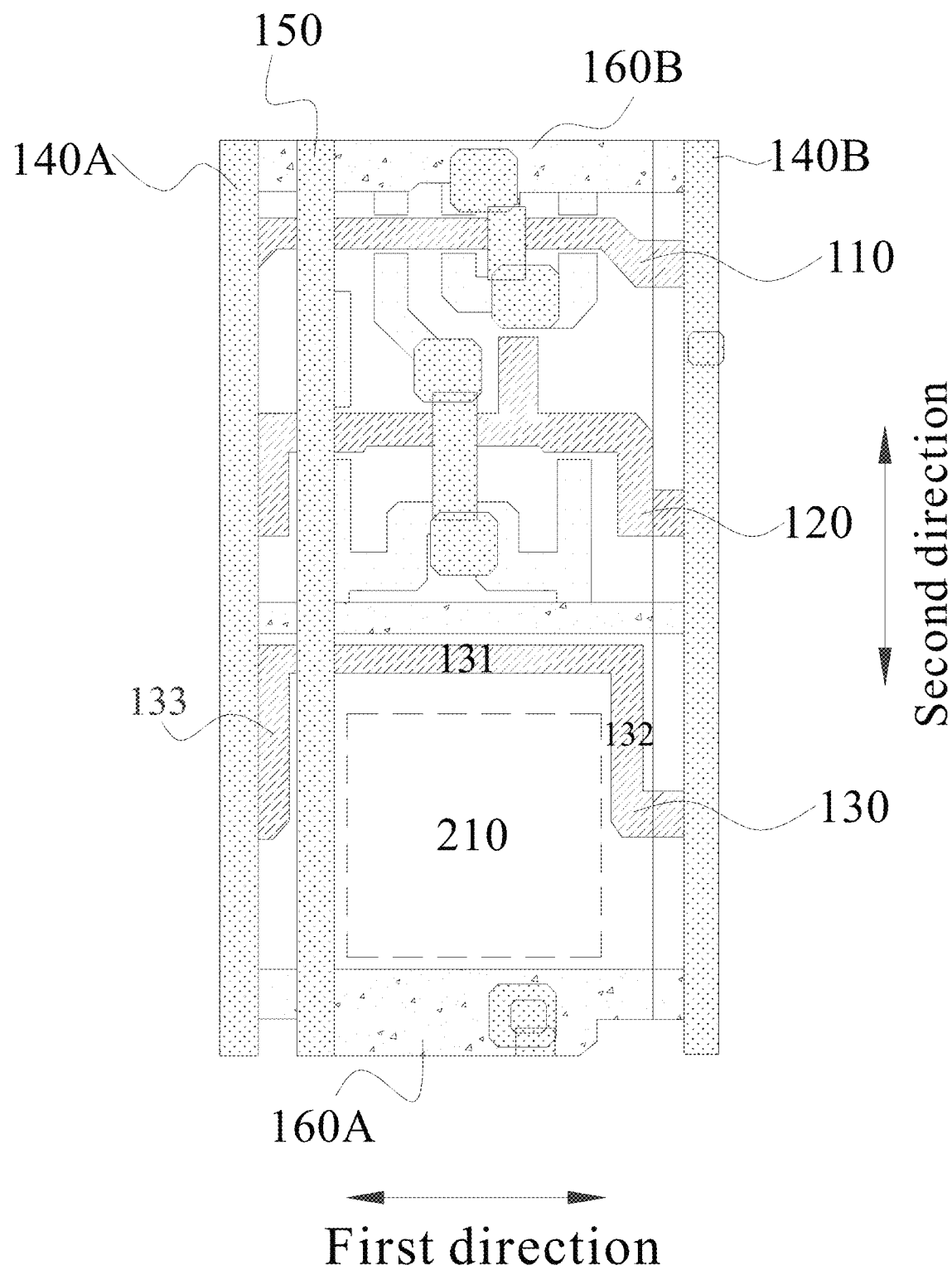
FIG. 6D shows a schematic top view of a first data line, a second data line, and a first power supply line formed at one side of a first initialization signal line, and a second initialization signal line away from a base substrate according to another embodiment of the present application.

According to some other embodiments of the present application, refer to FIGS. 6A to 6D, wherein FIG. 6A is a schematic top view of a first active layer 321A, FIG. 6B is a schematic top view of a reset control signal line 110, a gate line 120, and a light emitting control signal line 130 formed at one side of the first active layer 321A away from a base substrate, FIG. 6C is a schematic top view of a first initialization signal line 160A, and a second initialization signal line 160B formed at one side of the reset control signal line 110, the gate line 120, and the light emitting control signal line 130 away from a base substrate, and FIG. 6D is a schematic top view of a first data line 140A, a second data line 140B, and a first power supply line 150 formed at one side of a first initialization signal line 160A, and a second initialization signal line 160B away from a base substrate. FIGS. 6A to 6D show a stacking sequence and a position relationship between various structures, and for a convenience of showing the position relationship of the above various structures, insulating layers between the various structures are not shown in FIGS. 6A to 6D, and the stacking relationship between the above various structures and the insulating layers may refer to FIG. 3.

Figure 6E:
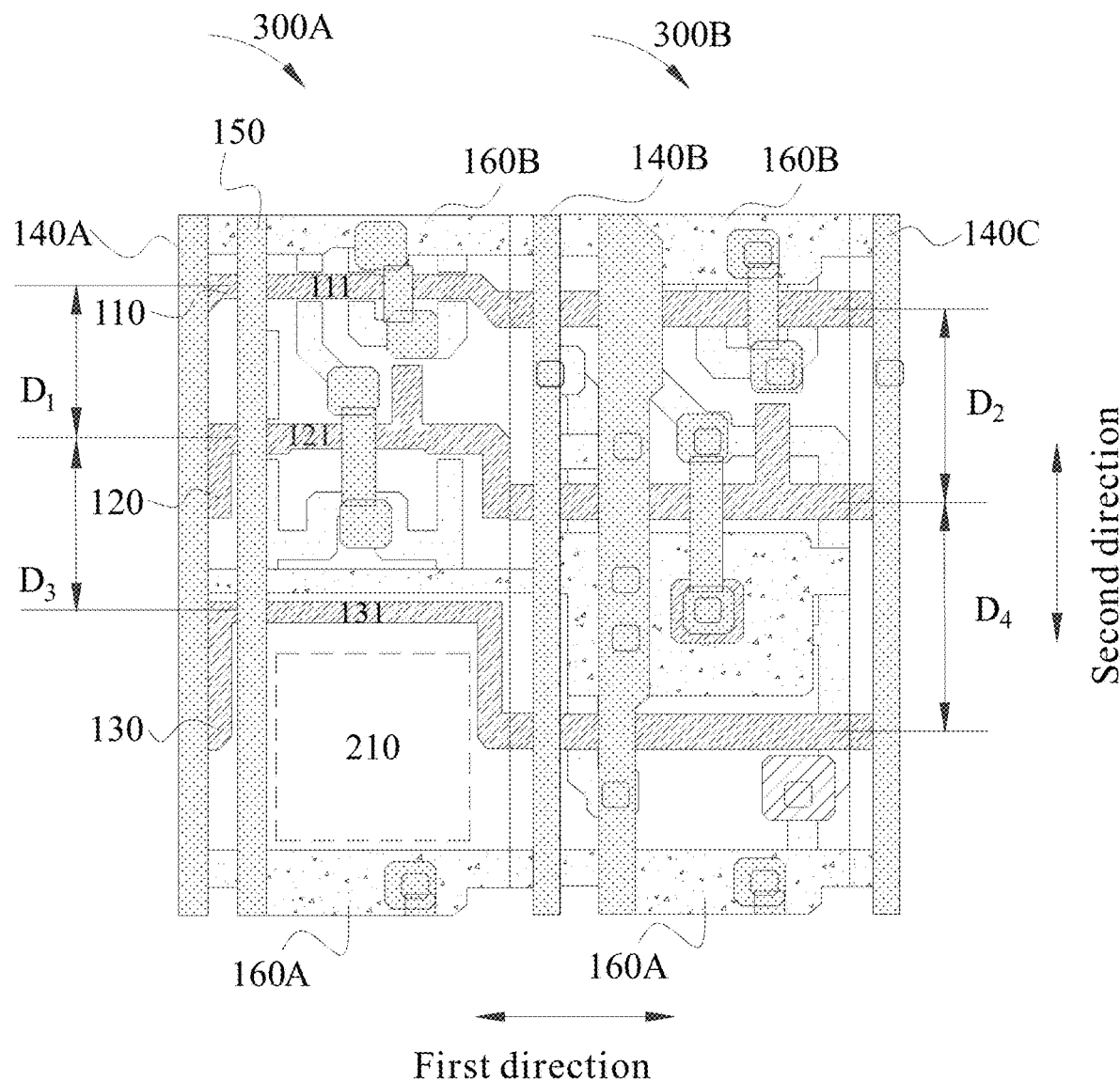
FIG. 6E shows a schematic diagram of a structure of a first sub-pixel and a second sub-pixel according to another embodiment of the present application.

Referring to FIG. 6D, in the first direction, a width of the light transmission hole 210 may be greater than ½ of a distance between the first data line 140A and the second data line 140B, at this time, referring to FIGS. 6C and 6D, the light emitting control signal line 130 includes a first sub-portion 131, a second sub-portion 132, and a third sub-portion 133, the first sub-portion 131 being located between the second sub-portion 132 and the third sub-portion 133, the first sub-portion 131 extending along the first direction, the second sub-portion 132 and the third sub-portion 133 extending along the second direction, and in the first direction, at least part of the second sub-portion 132 is located between the first power supply line 150 and the second data line 140B, referring to FIGS. 6A and 6E, an active layer in the pixel circuit structure of the first sub-pixel 300A is located within a region enclosed by the first initialization signal line 160A, the second initialization signal line 160B, the first data line 140A, and the second data line 140B, the active layer in the first sub-pixel 300A is a first active layer 321A, referring to FIG. 6B, an orthographic projection of the first active layer 321A on a base substrate has no overlapping region with an orthographic projection of the gate line 120 and the light emitting control signal line 130 on the base substrate (that is, a partial region of the first active layer 321A is disconnected and discontinuous, in other words, the pixel circuit structure of the first sub-pixel 300A does not have a light emitting control transistor and a driving transistor), and the light transmission hole 210 is located within a region enclosed by the first power supply line 150, the first sub-portion 131, the second sub-portion 132, and the first initialization signal line 160A.

Further, referring to FIG. 6D, in the first direction, at least part of the third sub-portion 133 is located between the first data line 140A and the first power supply line 150. Therefore, a larger region corresponding to the light transmission hole may be reserved within the first sub-pixel.

Since the pixel circuit structure needs to be disposed in the first sub-pixel, when the width of the light transmission hole is greater than ½ of the distance between the first data line and the second data line, a remaining area of the first sub-pixel may not be provided with a complete pixel circuit structure. Therefore, in the present embodiment, the first sub-pixel may be used as a Dummy sub-pixel, that is, the first sub-pixel does not emit light, so as to reduce disposing of the thin film transistor, and even not to dispose the thin film transistor, so as to ensure that the first sub-pixel reserves a larger region corresponding to the light transmission hole. In the present embodiment, an opening size of the light transmission hole is larger, the sensitivity of the fingerprint identification may be further improved, and it may be applied to a display apparatus with a sub-pixel with a relatively small size, that is, the present embodiment may dispose a light transmission hole with a larger opening size in the sub-pixel with a relatively small size. Thus, it may be applicable to a display apparatus with a relatively high resolution, so that the display apparatus can give consideration to both a high resolution and a high fingerprint identification sensitivity.

In the present embodiment, further, the orthographic projection of the first active layer 321A in the first sub-pixel on the base substrate 100 may also have no overlapping region with an orthographic projection of the reset control signal line 110 on the base substrate 100. Letting there is no reset control transistor, light emitting control transistor, threshold compensation transistor, data writing transistor, and driving transistor in the pixel circuit structure of the first sub-pixel may reduce a leakage. In the present embodiment, a fabrication of the lower electrode plate of the storage capacitor portion may be omitted, a process may be simplified, and a larger region corresponding to the light transmission hole may be reserved, and the present application reserves part of the first active layer, part of the source-drain metal layer, and part of the upper electrode plate of the storage capacitor portion (refer to FIG. 6C), which is beneficial to maintaining a uniformity of an etching process in a fabrication process of the display substrate.

According to an embodiment of the present application, when the width of the light transmission hole 210 is greater than ½ of the distance between the first data line 140A and the second data line 140B, the anode is not in contact with the light emitting layer in the light emitting element of the first sub-pixel. Since the first sub-pixel does not emit light, letting the anode of the light emitting element and the light emitting layer being not in contact may omit a process of digging holes in the pixel definition layer.

Figure 6F:
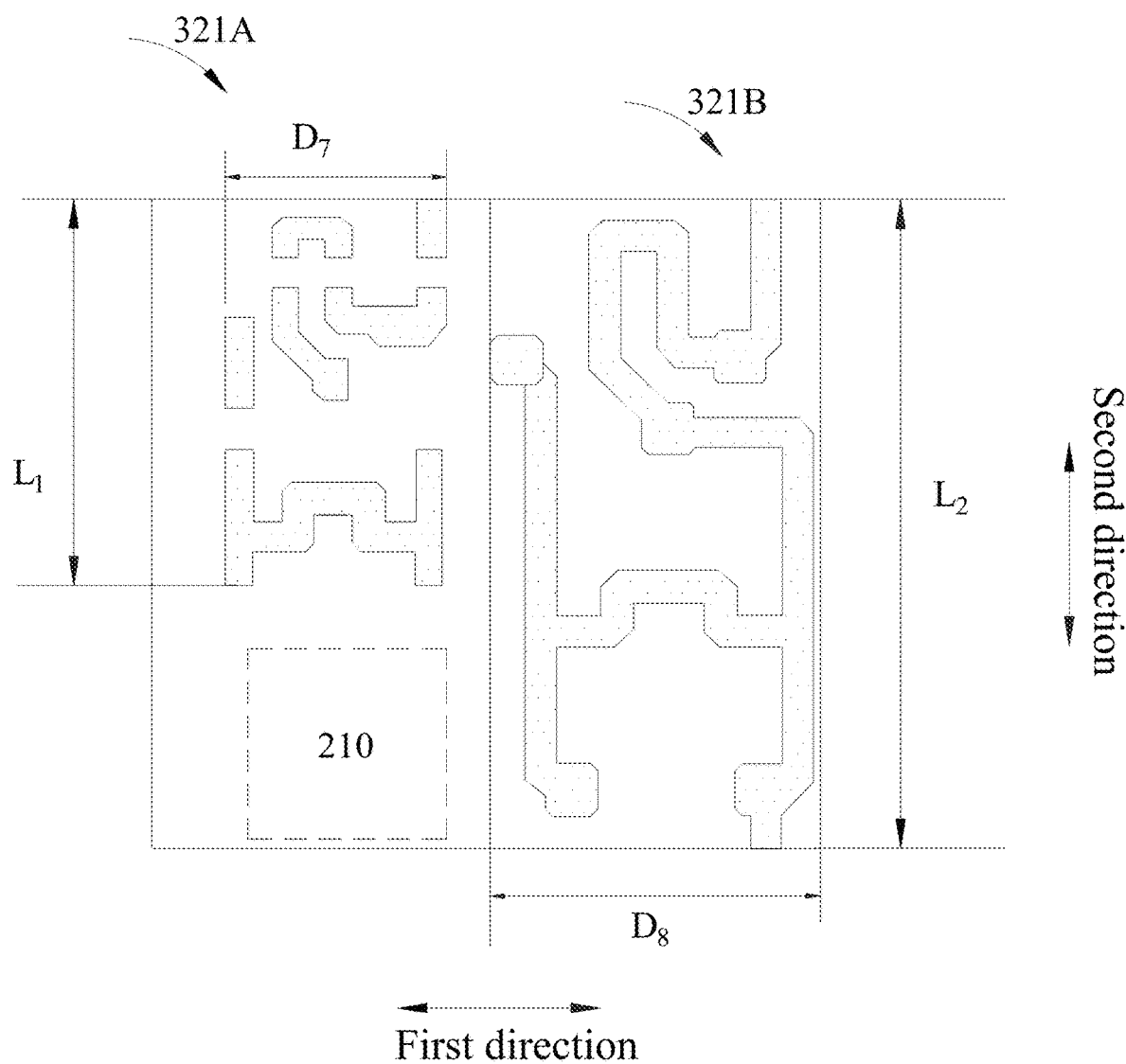
FIG. 6F shows a schematic top view of a first active layer and a second active layer according to another embodiment of the present application.

According to an embodiment of the present application, when the width of the light transmission hole 210 is greater than ½ of the distance between the first data line 140A and the second data line 140B, referring to FIG. 6E, the light transmission hole 210 is provided within the first sub-pixel 300A and no light transmission hole is provided within the second sub-pixel 300B, at this time, $D_1$ being less than $D_2$, $D_3$ being less than $D_4$, $D_7$ being less than $D_8$, and $L_1$ being less than $L_2$ (refer to FIGS. 6E and 6F) are also satisfied, which will not be repeated here.

It should be noted that, in the present embodiment, since the first sub-pixel 300A does not emit light, a distance between two adjacent signal lines may be continuously reduced (compared with a solution in which the width of the light transmission hole is ⅓ to ½ of the distance between the first data line and the second data line), so that a larger region corresponding to the light transmission hole can be reserved in the first sub-pixel 300A.

In the present embodiment, the multiple sub-pixels include a fourth sub-pixel (not shown in the figure) adjacent to the first sub-pixel 300A along the second direction, wherein the fourth sub-pixel is a sub-pixel that normally emits light, and a material of the light emitting layer in the fourth sub-pixel is the same as a material of the light emitting layer in the first sub-pixel. Since the first sub-pixel does not emit light, letting the material of the light emitting layer of the fourth sub-pixel being the same as the material of the light emitting layer of the first sub-pixel, a brightness compensation may be performed by the fourth sub-pixel, which may ensure that a display performance of the display apparatus does not significantly degrade.

Figure 8:
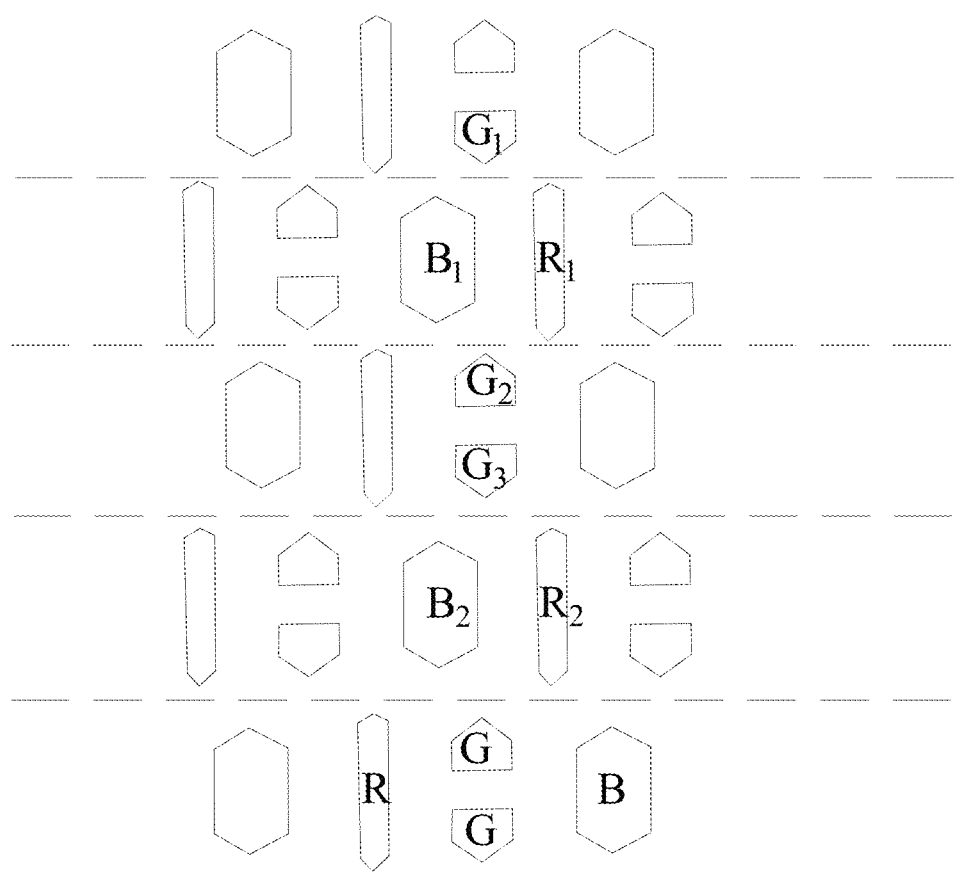
FIG. 8 shows a schematic diagram of a pixel arrangement according to an embodiment of the present application.

For example, taking a solution of red, green, and blue (RGB) three primary colors as an example, referring to FIG. 8 (FIG. 8 shows only part of the sub-pixels), in a row direction, each row is arranged in a red sub-pixel (R), two green sub-pixels (G) arranged along a column direction, and a blue sub-pixel (B); and in the column direction, the red sub-pixel is located at a position in the row corresponding to a region between a green sub-pixel and a blue sub-pixel of the previous row, the green sub-pixels are located at positions in the row corresponding to a region between a blue sub-pixel and a red sub-pixel of the previous row, and the blue sub-pixel is located at a position in the row corresponding to a region between a red sub-pixel and green sub-pixels of the previous row (i.e., various sub-pixels are staggered in the column direction). The above pixel arrangement makes a red sub-pixel and a blue sub-pixel be shared by two adjacent pixel units, for example, $B_1$, $R_1$, and $G_1$ constitute one pixel unit, while $B_1$, $R_1$, and $G_2$ constitute another pixel unit. And with the above pixel arrangement, there is another green sub-pixel (such as $G_3$) in a sub-pixel adjacent to the green sub-pixel (such as $G_2$), and when a width of the light transmission hole in the first direction is greater than ½ of the distance between the first data line and the second data line, the light transmission hole is disposed in one green sub-pixel, e.g. it is disposed in $G_2$ (i.e., the first sub-pixel 300A is the green sub-pixel $G_2$), that is, $G_2$ does not emit light, at this time, light emitting of the pixel unit composed of $B_1$, $R_1$, and $G_1$ is not affected. However, light emitting of the pixel unit composed of B1, R1, and G2 will be affected, at this time, by increasing a brightness of G3, a brightness compensation of green light may be performed to the pixel unit composed of B1, R1, and G2, which may alleviate a problem that a display performance of the pixel unit composed of B1, R1, and G2 is degraded because G2 does not emit light, and the pixel unit composed of B2, R2, and G3 can also emit light normally, so that the display apparatus as a whole has a good display performance. Moreover, the inventor has discovered that when the light transmission hole is disposed in the red sub-pixel or the blue sub-pixel, obvious black spots will appear when the display apparatus performs displaying.

According to an embodiment of the present application, the display substrate may include at least one fingerprint identification region, and the light transmission hole described above is provided within the fingerprint identification region. For example, the display substrate may have one fingerprint identification region, and during fingerprint identification, a finger needs to press a specific region (i.e., the fingerprint identification region) to achieve the fingerprint identification. Alternatively, the display substrate may be provided with multiple fingerprint identification regions, for example, any region within a whole display region of the display substrate may be a fingerprint identification region, and during fingerprint identification, a finger may press any one region to achieve the fingerprint identification.

In another aspect of the present application, the present application provides a display apparatus. According to an embodiment of the present application, the display apparatus includes the display substrate described above. Therefore, the display apparatus has all features and advantages of the display substrate described above, which will not be repeated here. In general, the display apparatus has a relatively high fingerprint identification sensitivity and a relatively high resolution.

In the description of the present application, an orientation or a position relationship indicated by terms "upper", "lower", etc. is based on an orientation or a position relationship shown in the drawings, and this is only for convenience of describing the present application, but does not require the present application must be constructed and operated in a specific orientation, and therefore it cannot be understood as a limitation on the present application.

In the description of this specification, a description of reference terms "an embodiment", "another embodiment", etc. means that a specific feature, a structure, a material, or a characteristic described in connection with the embodiment is included in at least one embodiment of the present application. In this description, the schematic expression of the above terms does not necessarily refer to the same embodiment or example. Moreover, the specific feature, structure, material, or characteristic described may be combined in a proper way in any one or more embodiments or examples. In addition, without a conflict, a person skilled in the art may combine different embodiments or examples described in this description and the features of different embodiments or examples. In addition, it should be noted that, in this specification, terms "first" and "second" are used for descriptive purposes only and cannot be understood as indicating or implying relative importance or implicitly indicating a quantity of technical features indicated.

Although the embodiments of the present application have been shown and described above, it should be understood that the above embodiments are exemplary, but will not be understood as the limitation to the present application. Alterations, modifications, substitutions and variations may be made to the above embodiments by those skilled in the art within the scope of the present application.

The invention claimed is:

1. A display substrate, comprising:
   a base substrate, comprising a display region;
   a plurality of sub-pixels, located in the display region, wherein a sub-pixel of the plurality of sub-pixels comprises a pixel circuit structure, and the plurality of sub-pixels comprise a first sub-pixel and a second sub-pixel adjacent along a first direction;
   a light shielding layer, located between the pixel circuit structure and the base substrate, wherein a light transmission hole is provided in the light shielding layer;
   a first initialization signal line, extending along the first direction;

a light emitting control signal line, extending along the first direction;

a first power supply line, extending along a second direction, wherein the first direction intersects with the second direction;

a first data line, extending along the second direction, wherein the first data line is connected with the pixel circuit structure of the first sub-pixel; and a second data line, extending along the second direction, wherein the second data line is connected with the pixel circuit structure of the second sub-pixel, and the first data line and the second data line are respectively located at two sides of the first power supply line;

wherein, the light transmission hole is located in a region enclosed by the first power supply line, the second data line, the light emitting control signal line, and the first initialization signal line.

2. The display substrate of claim 1, comprising a gate line, a reset control signal line, and a second initialization signal line extending along the first direction, wherein in the second direction, the gate line, the reset control signal line, and the second initialization signal line are sequentially arranged at a side of the light emitting control signal line away from the first initialization signal line, and the pixel circuit structure of the first sub-pixel and the pixel circuit structure of the second sub-pixel are respectively connected with the second initialization signal line.

3. The display substrate of claim 1, wherein in the first direction, a width of the light transmission hole is less than ⅓ of a distance between the first data line and the second data line, the pixel circuit structure of the first sub-pixel comprises a first light emitting control transistor and a second light emitting control transistor, a first electrode of the first light emitting control transistor is located at a first side of the light emitting control signal line, a second electrode of the first light emitting control transistor is located at a second side of the light emitting control signal line, a second electrode of the second light emitting control transistor is located at the first side of the light emitting control signal line, a first electrode of the second light emitting control transistor is located at the second side of the light emitting control signal line, the first side and the second side are two opposite sides of the light emitting control signal line, and the light transmission hole is located between the first electrode of the first light emitting control transistor and the second electrode of the second light emitting control transistor.

4. The display substrate of claim 1, wherein, in the first direction, a width of the light transmission hole is ⅓ to ½ of a distance between the first data line and the second data line, the light emitting control signal line comprises a first sub-portion, a second sub-portion, and a third sub-portion, the first sub-portion being located between the second sub-portion and the third sub-portion, the first sub-portion extending along the first direction, the second sub-portion and the third sub-portion extending along the second direction, and in the first direction, at least part of the second sub-portion is located between the first power supply line and the second data line, the pixel circuit structure of the first sub-pixel comprises a first light emitting control transistor and a second light emitting control transistor, a first electrode of the first light emitting control transistor being located at a first side of the first sub-portion, a second electrode of the first light emitting control transistor being located at a second side of the first sub-portion, a second electrode of the second light emitting control transistor being located at the first side of the first sub-portion, a first electrode of the second light emitting control transistor being located at the second side of the first sub-portion, and the first side and the second side being two opposite sides of the first sub-portion, and the light transmission hole is located in a region enclosed by the first power supply line, the second sub-portion, the second electrode of the second light emitting control transistor, the first electrode of the first light emitting control transistor, and the first initialization signal line.

5. The display substrate of claim 4, wherein, in the first direction, at least part of the third sub-portion is located at a side of the first data line away from the first power supply line, and the second sub-portion is located at a side of the second electrode of the second light emitting control transistor away from the first power supply line.

6. The display substrate of claim 1, wherein, in the first direction, a width of the light transmission hole is greater than ½ of a distance between the first data line and the second data line, the light emitting control signal line comprises a first sub-portion, a second sub-portion, and a third sub-portion, the first sub-portion being located between the second sub-portion and the third sub-portion, the first sub-portion extending along the first direction, the second sub-portion and the third sub-portion extending along the second direction, and in the first direction, at least part of the second sub-portion is located between the first power supply line and the second data line, an active layer in the pixel circuit structure of the first sub-pixel is located in a region enclosed by the first initialization signal line, the second initialization signal line, the first data line and the second data line, the active layer in the first sub-pixel is a first active layer, an orthographic projection of the first active layer on the base substrate has no overlapping region with an orthographic projection of the gate line and the light emitting control signal line on the base substrate, and the light transmission hole is located in a region enclosed by the first power supply line, the first sub-portion, the second sub-portion, and the first initialization signal line.

7. The display substrate of claim 6, wherein in the first direction, at least part of the third sub-portion is located between the first data line and the first power supply line.

8. The display substrate of claim 4, wherein the reset control signal line comprises a fourth sub-portion extending along the first direction and bent portions located at two ends of the fourth sub-portion, at least part of the fourth sub-portion being located between the first data line and the second data line, the gate line comprises a fifth sub-portion, a sixth sub-portion, and a seventh sub-portion, the fifth sub-portion being located between the sixth sub-portion and the seventh sub-portion, the fifth sub-portion extending along the first direction, the sixth sub-portion and the seventh sub-portion extending along the second direction, and in the first direction, at least part of the sixth sub-portion is located between the first data line and the second data line, the plurality of sub-pixels comprise a third sub-pixel adjacent to the second sub-pixel along the first direction, a third data line extends along the second direction, and is connected with the pixel circuit structure of the third sub-pixel, and parts of the reset control signal line, the gate line, and the light emitting control signal line located between the second data line and the third data line all extends along the first direction, wherein a distance between the fourth sub-portion and the fifth sub-portion is $D_1$, a spacing between a part of the reset control signal line located between the second data line and the third data line and a part of the gate line located between the second data line and the third data line is $D_2$, the $D_1$ is less than the $D_2$, a spacing between the fifth sub-portion and the first sub-portion is $D_3$, and a spacing between a part of the gate line located between the second data line and the third data line and a part of the light emitting control signal line located between the second data line and the third data line is $D_4$, and the $D_3$ is less than the $D_4$.

9. The display substrate of claim 8, wherein an active layer in the pixel circuit structure of the first sub-pixel is located in a region enclosed by the first initialization signal line, the second initialization signal line, the first data line, and the second data line, and an active layer in the pixel circuit structure of the second sub-pixel is located in a region enclosed by the first initialization signal line, the second initialization signal line, the second data line, and the third data line, wherein the active layer in the first sub-pixel is a first active layer, the active layer in the second sub-pixel is a second active layer, a width of the first active layer is $D_7$, a width of the second active layer is $D_8$, the $D_7$ is less than the $D_8$, a length of the first active layer is $L_1$, a length of the second active layer is $L_2$, and the $L_1$ is less than the $L_2$.

10. The display substrate of claim 8, wherein in the first direction, when the width of the light transmission hole is ⅓ to ½ of the distance between the first data line and the second data line, the first sub-pixel comprises a light emitting element, wherein the light emitting element is located at a side of the pixel circuit structure away from the base substrate, and in the second direction, an anode of the light emitting element is located at a side of the first sub-portion away from a second electrode of the second light emitting control transistor.

11. The display substrate of claim 8, wherein a ratio of a width of an active layer to a length of a gate of a thin film transistor in the pixel circuit structure of the first sub-pixel is consistent with a ratio of a width of an active layer to a length of a gate of a thin film transistor in the pixel circuit structure of the second sub-pixel.

12. The display substrate of claim 8, wherein in the first direction, when the width of the light transmission hole is greater than ½ of the distance between the first data line and the second data line, the first sub-pixel comprises a light emitting element, wherein the light emitting element is located at a side of the pixel circuit structure away from the base substrate, and an anode is not in contact with a light emitting layer in the light emitting element.

13. The display substrate of claim 12, wherein an orthographic projection of the first active layer on the base substrate has no overlapping region with an orthographic projection of the reset control signal line on the base substrate.

14. The display substrate of claim 1, wherein the display substrate comprises at least one fingerprint identification region, wherein the light transmission hole is provided in the fingerprint identification region.

15. A display apparatus, comprising a display substrate, wherein the display substrate comprises:

a base substrate, comprising a display region;

a plurality of sub-pixels, located in the display region, wherein a sub-pixel of the plurality of sub-pixels comprises a pixel circuit structure, and the plurality of sub-pixels comprise a first sub-pixel and a second sub-pixel adjacent along a first direction;

a light shielding layer, located between the pixel circuit structure and the base substrate, wherein a light transmission hole is provided in the light shielding layer;

a first initialization signal line, extending along the first direction;

a light emitting control signal line, extending along the first direction;

a first power supply line, extending along a second direction, wherein the first direction intersects with the second direction;

a first data line, extending along the second direction, wherein the first data line is connected with the pixel circuit structure of the first sub-pixel; and a second data line, extending along the second direction, wherein the second data line is connected with the pixel circuit structure of the second sub-pixel, and the first data line and the second data line are respectively located at two sides of the first power supply line;

wherein, the light transmission hole is located in a region enclosed by the first power supply line, the second data line, the light emitting control signal line, and the first initialization signal line.

16. The display substrate of claim 2, wherein in the first direction, a width of the light transmission hole is less than ⅓ of a distance between the first data line and the second data line, the pixel circuit structure of the first sub-pixel comprises a first light emitting control transistor and a second light emitting control transistor, a first electrode of the first light emitting control transistor is located at a first side of the light emitting control signal line, a second electrode of the first light emitting control transistor is located at a second side of the light emitting control signal line, a second electrode of the second light emitting control transistor is located at the first side of the light emitting control signal line, a first electrode of the second light emitting control transistor is located at the second side of the light emitting control signal line, the first side and the second side are two opposite sides of the light emitting control signal line, and the light transmission hole is located between the first electrode of the first light emitting control transistor and the second electrode of the second light emitting control transistor.

17. The display substrate of claim 2, wherein, in the first direction, a width of the light transmission hole is ⅓ to ½ of a distance between the first data line and the second data line, the light emitting control signal line comprises a first sub-portion, a second sub-portion, and a third sub-portion, the first sub-portion being located between the second sub-portion and the third sub-portion, the first sub-portion extending along the first direction, the second sub-portion and the third sub-portion extending along the second direction, and in the first direction, at least part of the second sub-portion is located between the first power supply line and the second data line, the pixel circuit structure of the first sub-pixel comprises a first light emitting control transistor and a second light emitting control transistor, a first electrode of the first light emitting control transistor being located at a first side of the first sub-portion, a second electrode of the first light emitting control transistor being located at a second side of the first sub-portion, a second electrode of the second light emitting control transistor being located at the first side of the first sub-portion, a first electrode of the second light emitting control transistor being located at the second side of the first sub-portion, and the first side and the second side being two opposite sides of the first sub-portion, and the light transmission hole is located in a region enclosed by the first power supply line, the second sub-portion, the second electrode of the second light emitting control transistor, the first electrode of the first light emitting control transistor, and the first initialization signal line.

18. The display substrate of claim 2, wherein, in the first direction, a width of the light transmission hole is greater than ½ of a distance between the first data line and the second data line, the light emitting control signal line comprises a first sub-portion, a second sub-portion, and a third sub-portion, the first sub-portion being located between the second sub-portion and the third sub-portion, the first sub-portion extending along the first direction, the second sub-portion and the third sub-portion extending along the second direction, and in the first direction, at least part of the second sub-portion is located between the first power supply line and the second data line, an active layer in the pixel circuit structure of the first sub-pixel is located in a region enclosed by the first initialization signal line, the second initialization signal line, the first data line and the second data line, the active layer in the first sub-pixel is a first active layer, an orthographic projection of the first active layer on the base substrate has no overlapping region with an orthographic projection of the gate line and the light emitting control signal line on the base substrate, and the light transmission hole is located in a region enclosed by the first power supply line, the first sub-portion, the second sub-portion, and the first initialization signal line.

19. The display substrate of claim 5, wherein the reset control signal line comprises a fourth sub-portion extending along the first direction and bent portions located at two ends of the fourth sub-portion, at least part of the fourth sub-portion being located between the first data line and the second data line, the gate line comprises a fifth sub-portion, a sixth sub-portion, and a seventh sub-portion, the fifth sub-portion being located between the sixth sub-portion and the seventh sub-portion, the fifth sub-portion extending along the first direction, the sixth sub-portion and the seventh sub-portion extending along the second direction, and in the first direction, at least part of the sixth sub-portion is located between the first data line and the second data line, the plurality of sub-pixels comprise a third sub-pixel adjacent to the second sub-pixel along the first direction, a third data line extends along the second direction, and is connected with the pixel circuit structure of the third sub-pixel, and parts of the reset control signal line, the gate line, and the light emitting control signal line located between the second data line and the third data line all extends along the first direction, wherein a distance between the fourth sub-portion and the fifth sub-portion is $D_1$, a spacing between a part of the reset control signal line located between the second data line and the third data line and a part of the gate line located between the second data line and the third data line is $D_2$, the $D_1$ is less than the $D_2$, a spacing between the fifth sub-portion and the first sub-portion is $D_3$, and a spacing between a part of the gate line located between the second data line and the third data line and a part of the light emitting control signal line located between the second data line and the third data line is $D_4$, and the $D_3$ is less than the $D_4$.

20. The display substrate of claim 6, wherein the reset control signal line comprises a fourth sub-portion extending along the first direction and bent portions located at two ends of the fourth sub-portion, at least part of the fourth sub-portion being located between the first data line and the second data line, the gate line comprises a fifth sub-portion, a sixth sub-portion, and a seventh sub-portion, the fifth sub-portion being located between the sixth sub-portion and the seventh sub-portion, the fifth sub-portion extending along the first direction, the sixth sub-portion and the seventh sub-portion extending along the second direction, and in the first direction, at least part of the sixth sub-portion is located between the first data line and the second data line, the plurality of sub-pixels comprise a third sub-pixel adjacent to the second sub-pixel along the first direction, a third data line extends along the second direction, and is connected with the pixel circuit structure of the third sub-pixel, and parts of the reset control signal line, the gate line, and the light emitting control signal line located between the second data line and the third data line all extends along the first direction, wherein a distance between the fourth sub-portion and the fifth sub-portion is $D_1$, a spacing between a part of the reset control signal line located between the second data line and the third data line and a part of the gate line located between the second data line and the third data line is $D_2$, the $D_1$ is less than the $D_2$, a spacing between the fifth sub-portion and the first sub-portion is $D_3$, and a spacing between a part of the gate line located between the second data line and the third data line and a part of the light emitting control signal line located between the second data line and the third data line is $D_4$, and the $D_3$ is less than the $D_4$.

* * * * *